United States Patent Office 3,637,678
Patented Jan. 25, 1972

---

3,637,678
DELTA-2 CEPHALOSPORIN COMPOUNDS
J. Alan Webber and Earle M. van Heyningen, Indianapolis, Ind., assignors to Eli Lilly and Company, Indianapolis, Ind.
No Drawing. Continuation-in-part of abandoned application Ser. No. 703,523, Feb. 7, 1968. This application Jan. 13, 1969, Ser. No. 790,886
Int. Cl. C07d 99/24
U.S. Cl. 260—243 C       20 Claims

ABSTRACT OF THE DISCLOSURE 3-bromomethyl - Δ² - cephalosporin ester intermediates, and Δ²-3-functionalized cephalosporin esters prepared by (a) brominating the 3-methyl group of a Δ²-desacetoxycephalosporin ester, and then (b) reacting the resulting 3-bromomethyl-Δ²-cephalosporin ester with a nucleophilic reagent to displace the bromine with the nucleophile and to form 3-(functionalized-methyl)-Δ²-cephalosporin esters which are useful as intermediates in the production of cephalosporin antibiotics, e.g., from penicillin starting materials.

CROSS-REFERENCE

This application is a continuation-in-part of our prior application, Ser. No. 703,523, filed Feb. 7, 1968, now abandoned.

INTRODUCTION

This invention relates to Δ²-cephalosporin esters, that is, to cephalosporin ester compounds having a carbon to carbon double bond between the carbon atoms in the 2 and 3 positions of the dihydrothiazine ring moiety of the cephalosporin ester compounds. More particularly, this invention provides a process for converting Δ²-desacetoxycephalosporin esters to Δ²-3-methyl-functionalized esters which are useful as intermediates in a chemical process route to antibiotically active Δ³-cephalosporanic acid derivatives. This invention also provides certain new 3-bromomethyl-Δ²-cephalosporin ester compounds which are made in the process of this invention, as well as some new Δ²-3-cyanomethyl-, 3-oxymethyl-ether, 3 - thiomethyl-ether and aliphatic aminomethyl-cephalosporin compounds which are useful as intermediates in a process for preparing Δ³-cephalosporin antibiotic compounds.

BACKGROUND OF THE INVENTION

The semi-synthetic production of 7-acylamidodesacetoxycephalosporin antibiotics from penicillin starting materials has become of importance recently, due to the process invention of Morin and Jackson (U.S. Pat. 3,275,626) who describe and claim a process for converting penicillin sulfoxide esters to desacetoxycephalosporanic acid esters and to the improvements on that Morin-Jackson process by Chauvette and Flynn (U.S. application Ser. No. 574,311, filed Aug. 23, 1966) who found that certain esters of the pencillin starting materials and of the resulting desacetoxycephalosporin ester products were more useful in the process in that they were more easily cleaved than those employed by Morin and Jackson. Further improvements of the Morin-Jackson process were claimed by Robin D. G. Cooper (U.S. applications Ser. No. 636,629, Ser. No. 636,593, and Ser. No. 636,592, all filed May 8, 1967, now combined into U.S. application Ser. No. 838,697, filed July 2, 1969) who found that the use of certain solvents directed the heat rearrangement of the penicillin sulfoxide esters more specifically toward production of the corresponding desacetoxycephalosporin esters and permitted the use of lower temperatures. Some of the 7-acylamidodesacetoxycephalosporanic acid compounds have been found to have unique properties as antibiotics in their own right. For example, cephalexin, 7 - [D - alpha - aminophenylacetamido] - 3 - methyl-Δ³-cephem-4-carboxylic acid zwitterion and pharmaceutically acceptable cationic and anionic salt forms thereof are useful as oral antibiotics in combatting infections caused, e.g., by penicillin resistant strains of *Staphylococcus aureus*, and many other Gram-positive and Gram-negative microorganisms.

One of the unique advantages of Δ³-desacetoxycephalosporin compunds, that is, compounds of the general formula

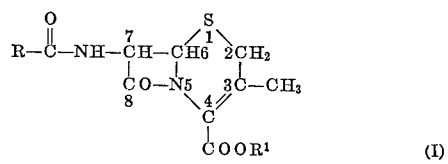

(I)

wherein R is the residue of the acylamido group in the 7-position, and R¹ is hydrogen, a salt forming cation, an ester group, or an anionic charge when the COO— forms a salt with a cation either within or outside of the molecules, is that such compounds can now be prepared from pencillin sulfoxide esters by the Morin-Jackson process, especially as improved by the Chauvette-Flynn and R. D. G. Cooper improvements.

In efforts to improve and expand the properties and utilities of these penicillin derived semi-synthetic cephalosporin substances, efforts have been expended on changing the 3-methyl group of the above Δ³-desacetoxycephalosporins to a group which gives the resulting cephalosporin compound enhanced antibiotic activity against one or more Gram-positive or Gram-negative microorganisms. However, to date at least, it has not been possible to convert directly a Δ³-desacetoxycephalosporin, to a 3-methyl functionalized Δ³-cephalosporin in any significant yield. Therefore, those in the chemical antibiotic art are in need of an alternative method or a route to the intrinsically more potent Δ³-3-methyl-functionalized cephalosporin antibiotics which heretofore have been obtained only from fermentation derived cephalosporin C, and the 7-aminocephalosporanic acid (7-ACA) obtained therefrom.

It is an object of this invention to provide a key chemical procedure for circumventing the difficulty in converting Δ³-desacetoxycephalosporins to 3-methyl-functionalized-Δ³-cephalosporanic acid antibiotics.

It is a further object of this invention to provide a process for converting Δ²-desacetoxycephalosporin ester compounds to 3-methyl-functionalized, Δ²-cephalosporin esters.

It is a specific object of this invention to provide a process for converting Δ²-7-acylamidodesacetoxycephalosporanate esters to Δ²-7-acylamidocephalosporanate esters having a nucleophilic group bonded to the —CH₂— group attached to the carbon atom in the 3-position of the dihydrothiazine ring moiety of the cephalosporin compound.

It is another specific object of this invention to provide certain new 3-bromomethyl-Δ²-cephalosporin ester compounds which are useful as intermediates in the production of cephalosporin antibiotics.

It is also an object of this invention to provide some new 3-cyanomethyl-, 3-oxymethyl ether, 3-thiomethyl ether and 3-aliphatic aminomethyl, Δ²-cephalosporin compounds which are useful in the preparation of the corresponding Δ³-cephalosporin antibiotics by the oxidation-reduction-de-esterification procedure described hereinafter, or by base isomerization.

DETAILED DESCRIPTION OF THE INVENTION

In the process of this invention (a) N-bromosuccinimide is reacted with a Δ²-cephalosporin ester compound of the formula

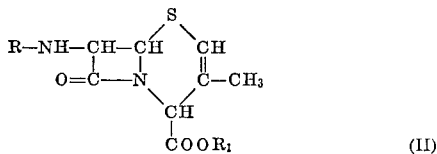

(II)

wherein R is an amino protecting group and R₁ is the residue of an ester group in a substantially anhydrous organic solvent medium at temperatures of from about 0° C. to reflux temperatures, preferably from about 40° C. to about 100° C. to form the corresponding 3-bromomethyl-Δ²-cephalosporin ester intermediate, and then (b) reacting the 3-bromomethyl-Δ²-cephalosporin ester intermediate with a nucleophilic substance to displace the bromine from the 3-bromomethyl intermediate with the nucleophile and thus to obtain a 3-"functionalized-methyl" Δ²-cephalosporin ester product. "Nucleophilic substance" as used herein is intended to mean a substance which provides a negatively charged group or neutral molecule bearing an unshared pair of electrons and which engages in a nucleophilic substitution reaction with the 3-bromomethyl-Δ²-cephalosporin ester intermediate to form as product a 3 - (nucleophile-methyl)-Δ²-cephalosporin ester product. Numerous examples of nucleophilic substances which can be used in this process are already known in the cephalosporin antibiotic patent literature to provide cephalosporin antibiotic compounds having the nucleophile on the methyl group in the 3-position. The products of the process of this invention, however, have the general formula

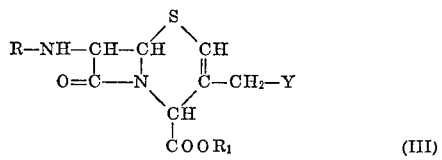

(III)

wherein R and R₁ are as defined above, and Y is the nucleophile or "functional" group derived from the nucleophilic reagent used in step (b) of the process of this invention. These products can also be referred to generally, for convenience, as 3-(nucleophile-methyl)-Δ²-cephalosporin esters in that the "3-(nucleophile-methyl)" refers to the —CH₂—Y group, Δ² refers to the position of the double bond in the cephem ring system, cephalosporin refers to the basic ring structure and side chain at position 7, and ester indicates the presence and chemical state of the carboxyl group attached to the carbon atom in the 4-position. For example, a preferred product of this invention 4-methoxybenzyl 7-phenoxyacetamido) - 3 - acetoxymethyl-Δ²-cephem - 4 - carboxylate, which is obtainable from penicilin V after heat rearrangement by the Morin-Jackson process and conversion by the process of this invention, can be referred to as a Δ²-cephalosporin ester to distinguish it from the corresponding Δ³-cephalosporin ester.

The Δ²-7-acylamido-3-(nucleophile-methyl) cephalosporin ester products of the process of this invention are useful as intermediates in the preparation of new and known Δ³-cephalosporin antibiotic substances which can be used in the treatment of diseases caused by Gram-positive and Gram-negative microorganisms. These Δ²-7-acylamido - 3 - (nucleophile-methyl)-cephalosporin ester products can be partially converted to the corresponding Δ³ - 7 - acylamido - 3 - nucleophile-methyl-sulfide-esters by heating them in a weakly basic medium which causes the Δ² double bond to shift to the Δ³ position, providing an equilibrium mixture of the Δ² product and the Δ³-7-acylamido - 3 - (nucleophile-methyl)-cephalosporin ester which is readily converted to an active antibiotic substance by removing the ester group by known methods, illustrated below. Preferably, however, the 7-acylamido-3-(nucleophile-methyl)-2-cephem - 4 - carboxylate ester product is chemically converted to the corresponding Δ³-ester by a process forming no part of this invention. That process involves (1) oxidation of the Δ²-sulfide-ester product to the corresponding Δ³-sulfoxide-ester with a peracid, (2) reduction of the Δ³-sulfoxide-ester with a reducing agent such as sodium bisulfite or sodium dithionite in the presence of an activator such as acetyl chloride in organic solvent diluent such as acetic acid or dimethylformamide to form the Δ³-sulfide-ester, and (3) then de-esterifying the Δ³-sulfide ester if desired, to the antibiotically active Δ³-sulfide-acid. If desired, mixtures of the active Δ³-cephalosporin acid antibiotic and inactive Δ²-cephalosporin acid, and pharmaceutically acceptable salts thereof can be used in such mixed form for some antibiotic purposes, e.g., as a topical antibiotic for open wounds in veterinary application in which cases the mixture can be dusted upon the wound, or compounded into an ointment and applied in such medium to inhibit the growth of various Gram-positive or Gram-negative microorganisms.

The Δ²-7-(protected amino)-3-(nucleophile-methyl)-sulfide-ester products of the process of this invention are useful as intermediates for the formation of Δ³-cephalosporin antibiotics having any desired 7-acylamido group known to contribute to antibiotic activity in cephalosporins. These products are (1) treated to remove the 7-protecting group and to form the Δ²-7-amino-3-(nucleophile-methyl)-sulfide ester, which can be (2) acylated as desired, e.g., with thiophene-2-acetic acid, acid chloride, or mixed anhydride, to form the corresponding Δ²-7-(thienylacetamido) - 3 - (nucleophile-methyl) - cephalosporin-ester, (3) which can be isomerized to the corresponding Δ³-7-(thienylacetamido)-3-(nucleophile-methyl)-cephalosporin-ester by an oxidation-reduction procedure, described above, and (4) de-esterified, e.g., by treatment with trifluoroacetic acid, alone, or with zinc in formic acid or acetic acid, to form the active cephalosporin antibiotic. Alternatively, the Δ²-cephalosporin ester may be first converted to a Δ³-ester and this ester cleaved to a Δ³ - 7 - amino-3-(nucleophile-methyl)-cephalosporin ester which can in turn be N-acylated, and deesterified to a Δ³-cephalosporin. An example of such a compound which can be prepared by such procedure is cephalothin, a widely accepted, commercially available cephalosphorin antibiotic, which is presently available only by way of fermentation derived Cephalosporin C and 7-ACA obtained therefrom.

This invention also provides a group of new 7-acylamido-3-bromomethyl-Δ²-cephem-4-carboxylic acid esters of the formula

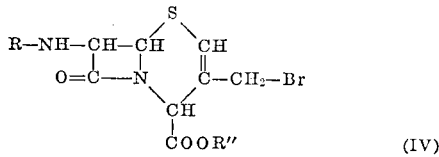

(IV)

as well as some new 7-acylamido-3-cyanomethyl-, 3-oxymethyl ether, 3-thiomethyl ether and 3-aliphatic aminomethyl-Δ²-cephem-4-carboxylic acids and esters of the formula

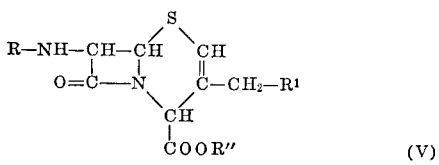

(V)

wherein in each of Formulas IV and V R is trimethylsilyl, triphenylmethyl, butoxycarbonyl, phenyl-α,α-dimethylacetyl, phenoxyacetyl, phenylacetyl, and phenylmercaptoacetyl and such phenoxyacetyl, phenylacetyl, phenylmercaptoacetyl, and phenyl-α,α-dimethylacetyl substituted on ring carbon atoms thereof with fluorine, chlorine, bromine, iodine, $C_1$ to $C_2$ alkoxy, butoxycarbonylmethyl, nitro, cyano, or trifluoromethyl, R' in Formula V is —CN, —XY where X is oxygen or sulfur, and Y is $C_1$ to $C_{10}$-alkyl, $C_3$ to $C_{10}$-alkenyl, $C_3$ to $C_{10}$-alkynyl, $C_2$ to $C_{10}$-haloalkyl, $C_3$ to $C_{10}$-haloalkenyl, and $C_3$ to $C_{10}$-haloalkynyl where X is oxygen or sulfur, $C_5$ to $C_7$-cycloalkyl, $C_5$ to $C_7$-$C_1$ to $C_3$-cyanoalkyl, $C_1$ to $C_3$ alkyl-X-$C_2$ to $C_6$-alkyl where X is oxygen or sulfur, $C_5$ to $C_7$cycloalkyl, $C_5$ to $C_7$-cycloalkyl-$C_1$ to $C_6$-alkyl, $C_1$ to $C_6$-alkyloxycarbonyl-$C_1$ to $C_6$-alkyl, $C_2$ to $C_4$-alkanoyl-$C_2$ to $C_6$-alkyl, $C_2$ to $C_4$-alkanoyloxy-$C_1$ to $C_6$-alkyl, (2'-tetrahydrofuryl)-$C_1$ to $C_3$-alkyl, (2'-thienyl)-$C_1$ to $C_3$-alkyl, phenyl-$C_1$ to $C_3$-alkyl, phenyl, benzyl, and phenylethyl and phenyl, benzyl, and phenylethyl substituted with cyano, nitro, trifluoromethyl, $C_1$ to $C_3$-alkyloxy, $C_1$ to $C_3$-alkyl, and $C_1$ to $C_3$-alkyloxycarbonyl (—COO-alkyl where alkyl has 1 to 3 carbons), or

where each of $R^3$ and $R^4$ taken separately is $C_1$ to $C_6$ alkyl, or taken together with the nitorgen to which they are bonded complete a heterocyclic, monocyclic ring containing from 5 to 6 ring atoms, of the formula

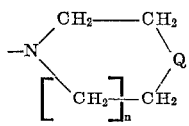

where n is 0 or 1, and Q is —$CH_2$—, —O—, —S—, or >$NR^5$ where $R^5$ is hydrogen or $C_1$ to $C_4$-alkyl, except when n is O, Q is —$CH_2$—, and R" is an easily removable ester group, the preferred ones of which are a $C_4$ to $C_6$-tert-alkyl, $C_5$ to $C_7$-tert-alkenyl, $C_5$ to $C_7$-tert-alkynyl, such as tert-butyl, 1,1-dimethyl-2-propenyl, and 1,1-dimethyl-2-pentynyl, benzyl, methoxybenzyl, nitrobenzyl, phenacyl, trimethylsilyl, benzhydryl, phthalimidomethyl and succinimidomethyl.

These new 7-acylamido-3-bromomethyl-$\Delta^2$-cephalosporin ester products are readily prepared according to the first step of the process of this invention using as starting materials the corresponding 7-acylamido-$\Delta^3$-desacetoxycephalosporin esters obtained by the Morin-Jackson heat rearrangement process from the corresponding penicillin esters, after isomerization of the $\Delta^3$ double bond to the $\Delta^2$ position by known methods. They are, of course, useful as intermediates to prepare the products of the second step of the process of this invention as described above. They also represent the preferred group of intermediates, in the route to the chemical manufacture of cephalosporin antibiotics having a 3-(nucleophile-methyl) group from penicillin starting materials.

Specific starting materials, intermediates, and products of the process of this invention are named, for convenience, by use of the "cepham" nomenclature system. "Penam" nomenclature for the penicillins is described by Sheehan, Henery-Logan, and Johnson in the Journal of the American Chemical Society (JACS), 75, 3292, footnote 2 (1953), and has been adapted to the cephalosporins by Morin, Jackson, Flynn, and Roeske. [JACS, 84, 3400 (1962).] In accordance with these systems of nomenclature "penam" and "cepham" refer respectively to the following saturated ring systems:

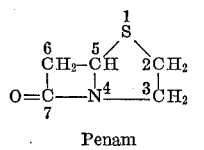 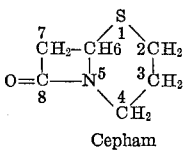

Penam                Cepham

"Cephem" refers to the cepham ring structure containing a double bond, the position of which is indicated by a prefixed "$\Delta$" with a superscript denoting the lowest numbered carbon atom to which the double bond is connected, or by the word "delta" with the same number relationship. Thus, for example, penicillin V, 6-phenoxymethylpenicillin, can be named 6-(phenoxyacetamido)-2,2-dimethylpenam-3-carboxylic acid, and 7-phenoxyacetamidodesacetoxycephalosporanic acid can be named as 7-phenoxyacetamido-3-methyl-$\Delta^3$-cephem-4-carboxylic acid. Sometimes the position of the double bond is indicated merely by the integer before the word "cephem."

Similarly, an appropriate starting material for the process of this invention

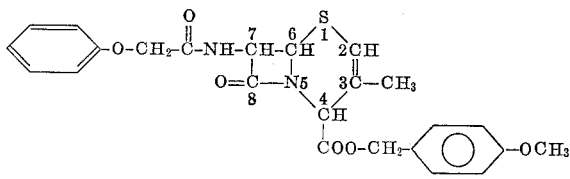

can be named as p-methoxybenzyl 7-phenoxyacetamido-3-methyl-$\Delta^2$-cephem-4-carboxylate.

The $\Delta^2$-desacetoxycephalosporin ester starting materials can be obtained from a variety of penicillin or cephalosporin sources by known methods. They are obtained by base treatment of the corresponding 3-methyl-$\Delta^3$-cephem-4-carboxylate ester as described, for example, in Example 4, of U.S. Pat. 3,275,626 of Morin and Jackson. They can also be obtained by hydrogenating a cephalosporin C derived cephalosporin ester to form the corresponding $\Delta^3$-desacetoxycephalosporin ester, and then treating $\Delta^3$-desacetoxycephalosporin ester with a base such as pyridine in the cold (0–10° C.) to isomerize the $\Delta^3$ double bond to the $\Delta^2$ double bond position. Attempts to brominate the allylic 3-methyl group of the $\Delta^3$-desacetoxycephalosporanate esters were not successful. Our successful bromination of the $\Delta^2$-desacetoxycephalosporanate esters was surprising and was not predictable.

The amino protecting group represented by R in above Formula II can be any group known to protect the nitrogen to which it is bonded from attack by N-bromosuccinimide. If the nitrogen is in the free amino state, excess brominating reactant will be needed to accomplish the purpose of the first step of the process of this invention. The R group may be, e.g., triphenylmethyl (trityl), trimethylsilyl, or as is most practical and preferred, an acyl group. Many acyl groups suitable for this purpose are already known in the penicillin and cephalosporin antibiotic literature. Some such acyl groups may be subject to bromination in which case N-bromosuccinimide in molar excess would be needed to brominate all of the 3-methyl group in the $\Delta^2$-desacetoxycephalosporanate ester. For example, if thienylacetyl, or furylacetyl are used as the acyl protecting group, the ring systems of these groups may be brominated in the first step of this process but such condition is not detrimental to the process especially where the 7-acyl group will be cleaved later in the process to form the corresponding 7-aminocephalosporin ester derivative. However, the preferred amino protecting group is an acyl group of the formula

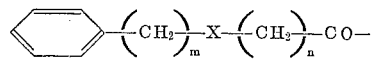

wherein m is an integer of from 0 to 4 inclusive, n is an integer of from 1 to 4 inclusive, X is oxygen or sulfur, or a chemical bond, and such acyl groups substituted on phenyl carbon atoms with fluorine, chlorine, bromine, iodine, $C_1$ to $C_6$-alkyl, $C_1$ to $C_2$ alkoxy, nitro, cyano, or trifluoromethyl groups. The acyl group can also have methyl groups in place of 1 or 2 of the hydrogens on the carbon atoms in the *m* or *n* groups. A few representative examples of such preferred acyl groups include:

phenylacetyl
phenoxyacetyl
phenylmercaptoacetyl
benzyloxyacetyl
3-methylphenylbutyryl
4-propylbenzylmercaptoacetyl
benzylmercaptopropionyl
phenylpropionyl
phenylethylmercaptopropionyl
phenylbutoxybutyryl
3-fluorophenoxyacetyl
4-bromophenylacetyl
2-chlorobenzyloxypropionyl
phenyl-α,α-dimethylacetyl
4-nitrophenylmercaptoacetyl
3-cyanophenylpropionyl
4-trifluorophenoxyacetyl, and the like.

Numerous other compounds which form amino protecting acyl groups which can be used in the R position are known in the prior art; e.g., those disclosed in the Behrens et al. U.S. Pats. 2,479,295 to 2,479,297 and 2,562,407 to 2,562,411, and 2,623,876.

The R″ symbol represents the residue of an ester forming alcohol. The alcohol used to form these esters should be one which is removable by known methods such as by dilute aqueous base or by the use of trifluoroacetic acid, or by hydrogenation in the presence of a palladium or rhodium catalyst on a suitable carrier such as carbon, barium sulfate or alumina so that the cephalosporin is not degraded. The preferred ester groups are those enumerated above.

In the first step of the process of this invention, the esterified $\Delta^2$-desacetoxycephalosporin starting material is commingled with N-bromosuccinimide in an organic liquid medium and stirred or otherwise agitated until the 3-bromomethyl product is formed. The reaction is preferably conducted in the presence of azobisisobutyronitrile as catalyst or initiator to improve the yield, but the process may be performed without the catalyst. The reaction proceeds faster when the mixture is heated somewhat and for that reason a temperature range of from about 40° C. to about 100° C. is stated. The temperature should be kept below the decomposition point of the starting material and product. Also, temperatures too low cause the reaction to proceed too slowly for efficient operation. The N-bromosuccinimide is usually present in at least stoichiometric amounts relative to the $\Delta^2$-desacetoxycephalosporanate ester since the latter is the more expensive. The amount of azobisisobutyronitrile or other initiator which is used is not critical. Organic liquid diluents for the reaction mixture include carbon tetrachloride or mixtures thereof with chloroform, tetrachloroethane, methylene chloride, benzene, toluene, xylene, heptane, and the like.

Examples of the new delta-2,3-bromomethyl intermediate compounds of this invention include:

4-methoxybenzyl 7-phenoxyacetamido-3-bromomethyl-$\Delta^2$-cephem-4-carboxylate,
4-methoxybenzyl 7-phenylacetamido-3-bromomethyl-$\Delta^2$-cephem-4-carboxylate,
Benzhydryl 7-phenylmercaptoacetamido-3-bromomethyl-$\Delta^2$-cephem-4-carboxylate,
Tert-butyl 7-(4′-nitrophenoxyacetamido)-3-bromomethyl-$\Delta^2$-cephem-4-carboxylate,
3,5-dimethoxybenzyl 7-(3′-chlorophenylmercaptoacetamido)-3-bromomethyl-$\Delta^2$-cephem-4-carboxylate,
Tert-butyl 7-(4′-iodophenoxyacetamido)-3-bromomethyl-$\Delta^2$-cephem-4-carboxylate,
3-methoxybenzyl 7-(3′,5′-dibromophenoxyacetamido)-3-bromomethyl-$\Delta^2$-cephem-4-carboxylate,
Phthalimidomethyl 7-benzamido-3-bromomethyl-$\Delta^2$-cephem-4-carboxylate,
Succinimidomethyl 7-(4′-trifluoromethylphenoxyacetamido)-3-bromomethyl-$\Delta^2$-cephem-4-carboxylate, and
Tert-butyl 7-(4′-fluorophenylmercaptopropionamido)-3-bromomethyl-$\Delta^2$-cephem-4-carboxylate,
Tert-butyl 7-phenoxyacetamido-3-bromomethyl-$\Delta^2$-cephem-4-carboxylate,
p-Nitrobenzyl 7-phenylacetamido-3-bromomethyl-$\Delta^2$-cephem-4-carboxylate,
1,1-dimethyl-2-propenyl 7-phenoxyacetamido-3-bromomethyl-$\Delta^2$-cephem-4-carboxylate,
1,1-dimethyl-2-propynyl 7-phenoxyacetamido-3-bromomethyl-$\Delta^2$-cephem-4-carboxylate.

When the bromination is completed, the $\Delta^2$-3-bromomethyl cephalosporin ester intermediate may either be isolated from the reaction mixture or be treated in the same reaction mixture in the second step of this process with a nucleophilic reagent thus displacing the bromine on the 3-methyl position with the nucleophile. In the organic medium the $\Delta^2$-3-bromomethyl cephalosporin ester intermediate is commingled or mixed with the selected nucleophilic reagent until the bromine atom is replaced with the nucleophile. With some nucleophilic reagents the mixture should be warmed to promote the speed of reaction. Refluxing of the mixture in a low-boiling solvent (e.g., below 100° C.) such as acetone, acetonitrile, dimethylformamide, dimethylsulfoxide, benzene, heptane, or the like, aids the conversion. Depending upon the type of nucleophilic reagent used, the bromide may appear in a by-product or as the salt of a quaternary nitrogen in the cephalosporin compound. The products may be oils or crystalline solids. The product can be purified by washing with non-solvents, or by chromatographic procedures. Alternatively, the product in the crude reaction mixture may be treated immediately with suitable oxidizing agents, e.g., meta-chloroperbenzoic acid to form the $\Delta^3$-cephalosporin sulfoxide ester therefrom, and then reduced with a suitable reducing agent such as sodium bisulfite or sodium dithionite in admixture with acetyl chloride and dimethylformamide to form the corresponding $\Delta^3$-functionalized cephalosporin ester. Some $\Delta^3$-cephalosporin esters, such as the acetoxymethyl cephalothin esters described in U.S. application, Ser. No. 573,820, filed Aug. 22, 1966, now U.S. Pat. No. 3,488,729, issued Jan. 6, 1970, may be used as such for antibiotic therapy to combat bacterial infections. However, for most applications, it is preferred to remove the protecting ester group by known methods to obtain the $\Delta^3$-cephalosporanic acid or zwitterion derivative. Suitable deesterification reagents which may be used include 2,2,2-trifluoroacetic acid, hydrochloric acid, p-toluenesulfonic acid, zinc in formic or acetic acid, hydrogenation in the presence of a palladium or barium sulfate, carbon, or alumina carrier, and the like. The resulting cephalosporanic acid or zwitterion may be used as such or converted to pharmaceutically acceptable salts; e.g., the alkali metal salt (e.g., the sodium or potassium salts), or soluble or insoluble amine salt form, depending upon the type of treatment for which the salt is intended. Insoluble salts with 1,4-bis(aminomethyl)cyclohexane are useful for "depot" type cephalosporin antibiotic administration, by which the cephalosporin antibiotics are made slowly available to the blood. In such form, the cephalosporin is usually administered by intramuscular injection of from 0.5 to 1 gram doses. Water soluble salts of the cephalosporin antibiotics, such as the sodium, monoethanol- or diethanolamine cephalosporin salts can be administered parenterally to provide total daily doses of from about 1 to about 6 grams of the active cephalosporin antibiotic per day to a patient of about 70 kilogram body weight.

The nucleophilic reagents which may be used to replace the bromine from the 3-bromomethyl group can be any compound or substance which provides a negatively charged group or neutral molecule bearing an unshared pair of electrons (e.g., pyridine) which engages in a bimolecular nucleophilic substitution with the 3-bromomethyl group. This type of reaction is often designated as $S_N$ type, where S stands for substitution and N for nucleophilic, and as described, for example, in Basic Principles of Organic Chemistry, by John D. Roberts, et al., Copyright 1964, W. A. Benjamin, Inc., New York, pages 281–306, particularly page 293. Many compounds containing nucleophilic groups are already known to be useful for supplying nucleophilic groups to make 3-nucleophile-methyl cephalosporin antibiotics, especially in the patent literature. Some nucleophilic reagents are more valuable than others in that the nucleophiles which the reagents supply contribute increased antibiotic activity to the resulting "functionalized" cephalosporin compound relative to the corresponding cephalosporin compound without the nucleophilic group.

The nucleophilic reagent as defined above includes those compounds which contain nucleophilic oxygen, sulfur, nitrogen, or carbon atoms as illustrated by the following groups of neucleophilic reagents which are preferred.

(1) Compounds of the formula:

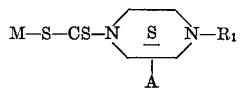

wherein M is hydrogen or alkali metal, $R_1$ is $C_1$ to $C_6$ alkyl, $C_3$ to $C_6$ alkenyl, carbo-$C_1$ to $C_2$ alkoxy, A is hydrogen or carboxyl, which compounds are illustrated, for example, by the 4-methyl, 4-ethyl, 4-isopropyl, 4-n-propyl, 4-isobutyl, 4-n-butyl, 4-n-amyl, 4-neopentyl, 4-n-hexyl, 4-allyl, 4-(2-butenyl), 4-carbomethoxy, and 4-carboethoxy- piperazino- dithio-carboxylates, and other compounds described more in detail in U.S. Pat. 3,239,516;

(2) Pyridine type compounds of the formula

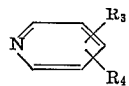

wherein $R_3$ is hydrogen, fluorine, chlorine, bromine, $C_1$ to $C_3$ alkyl, carboxyl, carboxamide (—$CONH_2$), N-methylcarboxamide, N,N-dimethylcarboxamide, and $R_4$ is hydrogen, fluorine, chlorine, bromine or $C_1$ to $C_3$ alkyl, e.g., pyridine, α-picoline, β-picoline, 3,5-dichloropyridine, 4-bromopyridine, 3-fluoropyridine, lutidine, picolinic acid, nicotinic acid, isonicotinic acid, nicotinamide, N-methyl nicotinamide, N-methylisonicotinamide, N,N-dimethylnicotinamide, and N,N-dimethylisonicotinamide as illustrated, for example, in U.S. Pat. 3,280,118;

(3) Thiourea, thioacetamide, thiosemicarbazide, N-alkylthiourea having from 1 to 6 carbon atoms in the alkyl, N-phenylthiourea, and alkali metal salts of such compounds, as illustrated, e.g., in U.S. Pat. 3,278,531;

(4) Dithiocarbamates and xanthates of the formulas

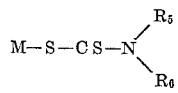

and

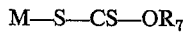

wherein each of $R_5$ and $R_6$ is $C_1$ to $C_6$ alkyl, or $R_5$ and $R_6$ taken together with the nitrogen atom to which they are bonded complete a 4 to 5 methylene carbon atom ring, $R_7$ is $C_1$ to $C_{12}$ primary alkyl, $C_3$ to $C_{12}$ secondary alkyl, $C_3$ to $C_7$ cycloalkyl, and M is alkali metal, e.g., sodium N,N-dimethyldithiocarboxylate, sodium piperidinodithiocarboxylate, and other such dithiocarboxylate reagents exemplified in U.S. Pat. 3,258,461; and sodium ethoxydithiocarboxylate, and other alkali metal xanthate salts prepared by the method of Drawert, Deuther, and Born, Ber., 93, 3064 (1960), and illustrated by the alkali metal xanthate nucleophilic reagents in U.S. application Ser. No. 426,440, filed Jan. 18, 1965, now U.S. Pat. No. 3,446,803; issued May 27, 1969;

(5) M—$N_3$, M—SCN, M—$NO_2$, M—CN, where M is alkali metal, illustrated by sodium or potassium azide, thiocyanate, nitrite, or cyanide as illustrated, for example, in U.S. Pat. 3,274,186, or M is cuprous copper in cuprous cyanide or silver ion as in silver cyanide which can also be used;

(6) Compounds of the formula

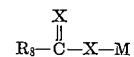

wherein each X is oxygen or sulfur, and $R_8$ is hydrogen, $C_1$ to $C_6$ alkyl, $C_2$ to $C_6$-alkenyl, phenyl, benzyl, and phenylethyl, and such phenyl, benzyl and phenylethyl groups substituted on ring carbon atoms thereof with trifluoromethyl, nitro, cyano, $C_1$ to $C_3$ alkyl, $C_1$ to $C_2$ alkoxy, fluorine, chlorine, or bromine, or $R_8$ is

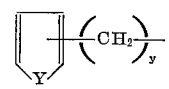

where Y is >NH, —O—, or —S—, and y is 0 to 1, and M is alkali metal or alkaline earth metal, which compounds are exemplified by the alkali metal or alkaline earth metal alkanoate salts of formic, acetic, propionic, butyric, pentanoic, hexanoic, acrylic, methylacrylic, crotonic, 3-hexenoic acids (as well as the thio analogs of such acids as thioacetic, thiopropionic, dithiobutyric, dithioacetic), thiophenecarboxylic, 3 - thiophenecarboxylic, 2 - furoic acids and the like, the alkali metal or alkaline earth metal salts, such as the calcium and magnesium salts, of benzoic acid, thiobenzoic acid, dithiobenzoic acid, phenylacetic acid, phenylthioacetic acid, phenyldithioacetic acid, phenylpropionic acid, phenylthiopropionic acid, phenyldithiopropionic acid, and substituted acids such as 4-trifluoromethylbenzoic acid, 3-nitrophenylacetic acid, 2-cyanophenylthioacetic acid, 4-methylphenyldithioacetic acid, 3-ethylphenylpropionic acid, 4-methoxyphenylacetic acid, 3-chlorophenylthioacetic acid, 4-fluorophenyldithiopropionic acid, 4-bromophenyldithioacetic acid, and 2-pyrrolylacetic, 3-pyrrolylacetic, 2-pyrrolylthioacetic, and 3-pyrrolyldithioacetic, 2-thienylacetic, 3-thienylacetic, 2-thienylthioacetic acids, 2-furylacetic, 3-furylacetic, and 3-furylthioacetic acids, as illustrated, for example, in U.S. Pats. 3,218,318 and 3,261,832;

(7) Amines selected from the group consisting of primary alkylamines having from 1 to 6 carbon atoms in the alkyl group, dialkylamines having from 1 to 6 carbon atoms in each alkyl group, and trialkylamines having a total of from 3 to 12 atoms, monocyclic cycloaliphatic amines having from 5 to 7 carbon atoms, monocyclic saturated nitrogen containing heterocyclic amines containing from 4 to 6 carbon atoms and a total of from 5 to 7 ring forming atoms, and aromatic amines of the formula

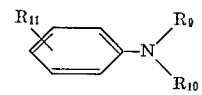

wherein each of $R_9$ and $R_{10}$ is hydrogen or methyl, and $R_{11}$ is hydrogen, $C_1$ to $C_6$ alkyl, $C_1$ to $C_2$ alkoxy, examples of which amines include methylamine, ethylamine, isopropylamine, hexylamine, dimethylamine, diethylamine, dibutylamine, dihexylamine, piperidine, morpholine, 4-methylpiperazine, thiomorpholine, trimethylamine, triethylamine, tributylamine, cyclopentylamine, cyclohexylamine, cycloheptylamine, N-methylcyclohexylamine, piperazine, pyrrolidine, aniline, N-methylaniline, N,N-dimethylaniline, 4-methylaniline, 4-methyl-N-methylaniline, 3-propylaniline, and the like;

(8) Compounds of the formula

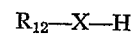

wherein X is oxygen or sulfur, and $R_{12}$ is the residue of an alcohol or mercaptan, preferably having a molecular weight below about 200 but which can, for illustration, be exemplified by hydrogen $C_1$ to $C_{10}$-alkyl
$C_3$ to $C_{10}$-alkenyl
$C_3$ to $C_{10}$-alkynyl
$C_2$ to $C_{10}$-haloalkyl, $C_3$ to $C_{10}$-haloalkenyl and $C_3$ to $C_{10}$-haloalkynyl where the halogen is fluorine, chlorine, bromine or iodine,
$C_1$ to $C_3$-cyanoalkyl,
$C_5$ to $C_7$-cycloalkyl,
$C_5$ to $C_7$-cycloalkyl-$C_1$ to $C_6$-alkyl,
phenyl, benzyl, phenylethyl and such phenyl, benzyl, and phenylethyl substituted on ring carbon atoms thereof with $C_1$ to $C_3$-alkyl, $C_1$ to $C_3$-alkoxy, $C_1$ to $C_3$-alkyloxycarbonyl (—COO-alkyl where alkyl has 1 to 3 carbons), fluorine, chlorine, bromine, nitro, cyano, or trifluoromethyl, $C_1$ to $C_3$-alkyl-X-$C_2$ to $C_6$-alkyl where X is oxygen or sulfur,
$C_2$ to $C_4$-alkanoyl-$C_1$ to $C_6$-alkyl,
$C_2$ to $C_4$ alkanoyloxy-$C_2$ to $C_6$-alkyl,
$C_1$ to $C_6$-alkyloxycarbonyl-$C_1$ to $C_6$-alkyl,

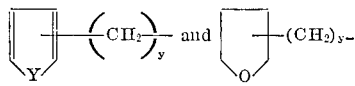

where Y is —O—, —S—, or >NH and $y$ is 0 to 2 and the like, as well as sodium, potassium, and calcium salts of all of such compounds that have pKa's less than 11.

Examples of such compounds include water, hydrogen sulfide, alcohols and mercaptans such as methanol, ethanol, isopropanol, tert-butanol, hexanol, octanol, decanol, allyl alcohol, 3-butenyl alcohol, 3-hexenyl alcohol, 4-octenyl alcohol, 9-decenyl alcohol, propargyl alcohol, 3-butynol, 3-hexynol, 4-octynol, 4-chloro-1-butanol, cyclohexanol, cyclopentanol, cycloheptanol, cyclopentylethanol, cyclohexylpropanol, 2-chloroethanol, 2-bromopropanol, 2-chloro-2-butenyl alcohol, 2-chloro-3-butynol alcohol, 2-pyrrolylmethanol, 3-pyrrolylpropanol, furanol, 2-thienylmethanol, thiophene-ol, 2-thienylethanol, 2-furylmethanol, and 3-furylethanol, 2-cyanoethanol, 3-cyanopropanol, benzyl alcohol, anisyl alcohol, p-nitrobenzyl alcohol, phenylethanol, 4-trifluoromethylphenylethanol, p-cyanobenzyl alcohol, propyloxyethanol, methoxyethanol, ethoxyethanol, propionoylethanol, butanoyloxypropanol, butoxycarbonylethanol, phenol, p-toluol, 3-chlorophenol, 4-ethoxyphenol, resorcinol, and the corresponding mercaptan analogs, a few examples of which are methyl mercaptan, allyl mercaptan, phenyl mercaptan, benzyl mercaptan, furanthiol, thiophenethiol, 2-thienylethyl mercaptan, 3-thienylmethyl mercaptan, 2-furylethyl mercaptan, and the alkali metal or alkaline earth metal salts of such alcohols, phenols, and mercaptans that have pKa's less than 11.

(9) N-aminoalkyldithiocarbamate compounds of the formula

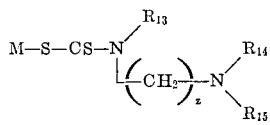

where $z$ is 2 or 3, $R_{13}$ is $C_1$ to $C_6$ alkyl, each of $R_{14}$ and $R_{15}$ taken separately is $C_1$ to $C_6$ alkyl, $R_{14}$ and $R_{15}$ taken together with the nitrogen to which they are bonded form a ring containing from 4 to 6 ring carbon atoms, and $R_{14}$ and $R_{15}$ taken together contain a total of not more than 8 carbon atoms, and M is hydrogen or alkali metal, illustrated by N-methyl-N-(2'-dimethylaminoethyl)dithiocarbamate, N-methyl-N - (2' - diethylaminoethyl)dithiocarbamate, N-hexyl-N-(2' - di-n-propylaminoethyl)dithiocarbamate, N-methyl-N - (2' - morpholinoethyl)dithiocarbamate, N-methyl-N - (2' - piperidino-propyl)dithiocarbamate; e.g., as described in U.S. Pat. 3,239,515.

Specific examples of products obtained by the process of this invention and the nucleophilic reagents which can be used to prepare them by displacement of the bromine from the 3-bromomethyl cephalosporin intermediates include:

7-(4'-trifluoromethylphenoxyacetamido) - 3 - (4-methylpiperazinodithiocarboxylate)-$\Delta^2$-cephem - 4 - carboxylate ester from 4-methylpiperazinodithiocarboxylate;

7-(2'-phenoxyacetamido) - 3 - (4',4'-dimethylpiperazinodithiocarboxylate)-$\Delta^2$-cephem - 4 - carboxylate ester iodide from 4 - methylpiperazinodithiocarboxylate, and then treated with methyl iodide;

7-(3'-chlorophenoxyacetamido) - 3 - pyridinomethyl-$\Delta^2$-cephem-4-carboxylate ester bromide from pyridine;

7-[2'(3-chlorophenylmercaptoacetamido)] - 3 - (3'-carbamoylpyridinomethyl)-$\Delta^2$-cephem - 4 - carboxylate ester bromide from nicotinamide;

7-(4'-phenylbutoxyacetamido) - 3 - (2' - pseudothioureidomethyl)-$\Delta^2$-cephem - 4 - carboxylate ester bromide from thiourea;

7 - [4'' - (tert-butoxycarbamidomethyl)benzamido]-3-(2'-imidazolylthiomethyl)-$\Delta^2$-cephem - 4 - carboxylate ester from 2-mercaptoimidazole;

7-[phenoxyacetamido] - 3 - (azidomethyl)-$\Delta^2$-cephem-4-carboxylate ester from sodium azide, and the product obtained by reducing the 3-azidomethyl group to the 3-aminomethyl group by catalytic hydrogenation with palladium or platinum catalyst;

7 - (phenylmercaptoacetamido) - 3 - aminomethyl-$\Delta^2$-cephem-4-carboxylate from sodium azide, and then reducing the azide group to the amino group;

7 - (phenylmercaptoacetamido) - 3 - N,N - dimethyldithiocarbamylmethyl - $\Delta^2$ - cephem - 4 - carboxylate ester from N,N-dimethyldithiocarbamate, sodium salt;

7 - (ethylmercaptoacetamido) - 3 - N,N - dimethyldithiocarbamylmethyl - $\Delta^2$ - cephem - 4 - carboxylate ester from N,N-dimethyldithiocarboxylate, sodium salt;

7 - (3' - chlorophenoxyacetamido) - 3 - (picolinoylthiomethyl) - $\Delta^2$ - cephem - 4 - carboxylate ester from sodium thiopicolinate;

7 - (4' - nitrobenzyloxyacetamido) - 3 - (4' - nitrobenzoylthiomethyl) - $\Delta^2$ - cephem - 4 - carboxylate ester from sodium 4-nitrothiobenzoate;

7 - (3' - methoxyphenylacetamido) - 3 - (4' - tert-butylpiperazinothiocarbonylthiomethyl) - $\Delta^2$ - cephem-4-carboxylate ester from sodium 4'-tert-butylpiperazinodithiocarboxylate;

7 - (3' - chlorophenoxyacetamido) - 3 - (4' - methylpiperazinothiocarbonylthiomethyl) - $\Delta^2$ - cephem - 4-carboxylate ester from sodium 4 - methylpiperazinodithiocarboxylate;

7 - [5' - (4'' - cyanophenoxy)pentanamido] - 3 - (4-isopropylpiperazinothiocarbonyl - thiomethyl) - $\Delta^2$-cephem - 4 - carboxylate ester from sodium 4 - isopropylpiperazinodithiocarboxylate;

7 - (2' - fluorophenylacetamido) - 3 - (N - sec - butyl-N - (2' - dimethylaminoethyl]aminothiocarbonylthiomethyl) - $\Delta^2$ - cephem - 4 - carboxylate ester from sodium N - sec - butyl - N - [2' - dimethylaminoethyl]aminodithiocarboxylate;

7 - (caprylamido) - 3 - [N - methyl - N - 2(N' - ethyl-N' - n - hexylamino)ethyl]aminothiocarbonylthiomethyl) - $\Delta^2$ - cephem - 4 - carboxylate ester from sodium N - methyl - N - [2 - (N' - ethyl - N' - n - hexylamino)-ethyl]aminodithiocarboxylate;

7 - [2' - (phenylisopropoxy)acetamido] - 3 - (acetoxymethyl) - $\Delta^2$ - cephem - 4 - carboxylate ester from potassium acetate;

7 - (phenoxyacetamido) - 3 - (propionoxymethyl) - $\Delta^2$-cephem - 4 - carboxylate ester from sodium propionate; and 7 - (naphthylmercaptoacetamido) - 3 - (hexanoyloxymethyl) - $\Delta^2$ - cephem - 4 - carboxylate from potassium hexanoate, where the ester groups are as defined above.

The invention is further illustrated by the following detailed examples which illustrate the preparation of the starting $\Delta^2$-desacetoxycephalosporin esters, the process of this invention, and the method of converting the $\Delta^2$ functionalized cephalosporin ester products to the corresponding $\Delta^3$-cephalosporanic acids which are active antibiotic substances.

EXAMPLE 1

Delta-2 acid preparation

A 3.63 gm. (0.01 mole) portion of methyl 7-(phenoxyacetamido) - 3 - methyl-$\Delta^3$ - cephem - 4 - carboxylate prepared from desacetoxyceph V and diazomethane), in 100 cc. of 1:1 pyridine: $H_2O$ was cooled in an ice-water bath. One equivalent of 1 N NaOH solution was added, and the mixture was stirred in the cold for 5 hours. After dilution with 100 cc. of water and 100 cc. of ethyl acetate, the mixture was cooled and acidified to pH 2.5 with 20 percent CHl. The ethyl acetate was removed, and the aqueous layer was extracted once with ethyl acetate. The combined organic layers were cooled, water was added, and the pH adjusted to 8.2 with solid $NaHCO_3$. The aqueous layer was removed, washed once with ethyl acetate, then cooled. layered with ethyl acetate and acidified to pH 2.5. The ethyl acetate was removed, and the aqueous layer washed with ethyl acetate, and the combined organic layers washed twice with sodium chloride solution, dried over magnesium sulfate, filtered and evaporated to give a foam.

The foam porduct was dissolved in and crystallized from ethyl acetate to give 1.6 gm. (45 percent) of the 7 - (phenoxyacetamido) - 3 - methyl - $\Delta^2$ - cephem - 4- carboxylic acid, M.P. 180–183° (d.).

Esterification of delta-2 desacetoxycephalosporanic acid p-Methoxybenzyl 3-methyl-7-phenoxyacetamido-$\Delta^2$-cephem-4-carboxylate To a stirred suspension of 1.75 gm. (0.005 mole) $\Delta^2$-desacetoxyceph V [7 - phenoxyacetamido - 3 - methyl-$\Delta^2$ - cephem - 4 - carboxylic acid] and 700 mg. (0.005 mole) of p-methoxybenzyl alcohol in 20 cc. of methylene chloride was added a condensing agent solution of 1.23 gm. (5 percent excess) of DMF dineopentylacetal in methylene chloride. Dissolution was complete in a few minutes. The reaction was stirred overnight at room temperature. The solvent was removed, and benzene was added. After warming to effect dissolution, the mixture was allowed to stand at room temperature.

After removing a crystalline side reaction product, the benzene mother liquors were diluted, washed three times with bicarbonate solution, twice with sodium chloride solution, dried over magnesium sulfate, filtered and evaporated. The residue was crystallized from $CCl_4$ to give the 4 - methoxybenzyl 7 - phenoxyacetamido - 3- methyl - $\Delta^2$ - cephem - 4 - carboxylate. First crop of 1.15 gm., M.P. 108—112°; second crop 0.16 gm., M.P. 107–111°; 55 percent yield.

Functionalization of p-methoxybenzyl 3-methyl-7-phenoxyacetamido-$\Delta^2$-cephem-4-carboxylate A mixture of 235 mg. of p-methoxybenzyl 3-methyl-7-phenoxyacetamido-$\Delta^2$- and $\Delta^3$-cephem-4-carboxylate, 90 mg. of N-bromosuccinimide (NBS), 14 mg. of azobisisobutyronitrile, and 30 cc. of $CCl_4$ was refluxed under $N_2$, protected from the light for 14 hours. The reaction mixture was cooled, filtered, and the golden yellow filtrate evaporated to dryness. To the residue were added 25 mg. of potassium acetate and 15 cc. of acetone, and this mixture was refluxed for six hours under $N_2$, protected from the light, and then stirred at room temperature overnight. The dark red-brown solution was evaporated to dryness, the residue was taken up in chloroform, filtered and evaporated to give 250 mg. of a red-brown oil.

This oil was purified twice by preparative thin-layer chromatography to give 103 mg. of a mixture of $\Delta^2$-$\Delta^3$-p-methoxybenzyl esters of ceph V.

Cleavage of the $\Delta^2$-$\Delta^3$ ester mixed product with trifluoroacetic acid in benzene gave material which contained ceph V acid, a known antibiotic, as shown by thin chromatography and a bioautogram of a paper chromatogram.

m-Chloroperbenzoic acid oxidation of the $\Delta^2$-$\Delta^3$ ester mixture in chloroform gave a high yield of the corresponding p - methoxybenzyl 3 - acetoxymethyl - 7 - (2'-phenoxyacetamido) - $\Delta^3$ - cephem - 4 - carboxylate - 1-oxide, M.P. 161–163° (from methanol).

Reduction of p-methoxybenzyl 3-acetoxymethyl-7-phenoxyacetamido-$\Delta^3$-cephem-4-carboxylate-1-oxide To a solution of 500 mg. of the sulfoxide, 4-methoxybenzyl 3-acetoxymethyl - 7 - (2'-phenoxyacetamido)-$\Delta^2$-cephem-4-carboxylate-1-oxide, in 40 cc. dimethylformamide (DMF) was added 10 cc. of acetyl chloride and then 3 gm. of sodium dithionite. An exothermic reaction ensued. After stirring 4 hours at room temperature to insure complete reaction, the mixture was cooled, diluted with benzene and quenched with aqueous sodium bicarbonate. After the vigorous gas evolution had subsided, more benzene was added, and the organic layer was separated and washed well with aqueous sodium bicarbonate solution and then with sodium chloride solution, dried over magnesium sulfate, filtered, and evaporated to give 635 mg. brown oil.

This product was purified on a column of silica gel—15 percent $H_2O$. There was obtained 253 mg. of an oil whose NMR, infra-red (I.R.), and ultraviolet (U.V.) spectra were the same as those of p-methoxybenzyl 7-(2'-phenoxyacetamido)-$\Delta^3$-cephem - 4 - carboxylate prepared from fermentation derived 7-aminocephalosporanic acid (7-ACA). This oily ester product could be crystallized from ether, to give 195 mg. of material, M.P. 118–119°, whose melting point was not depressed when mixed with known samples of the same compound.

Cleavage of p-methoxybenzyl ester to ceph V

To a solution of 105 mg. p-methoxybenzyl 7-(phenoxyacetamido)-3-acetoxymethyl-$\Delta^3$-cephem - 4 - carboxylate ester and 22 mg. of anisole in 10 cc. of dry benzene was added 0.5 cc. of trifluoroacetic acid. The mixture was stirred for two hours at room temperature under nitrogen and then evaporated to dryness. The residue was taken up in ethyl acetate and extracted three times with aqueous sodium bicarbonate solution.

The ethyl acetate solution was evaporated to give 55 mg. of neutral product.

The bicarbonate extracts were cooled, layered with ethyl acetate and adjusted to pH 2.4 with 20 percent HCl. The ethyl acetate layer was separated and the aqueous portion extracted once with ethyl acetate. The combined organic layers were washed twice with sodium chloride solution, dried, filtered and evaporated to give 86 mg. of a colorless oil, which possessed the same $R_f$ as 7-(phenoxyacetamido)-3-acetoxymethyl-$\Delta^3$-cephem - 4 - carboxylic acid in a thin layer chromatogram. The chloroform solution of this oil deposited a solid which was removed by filtration. The filtrate was evaporated to leave 65 mg. of product which was shown to be 7-(phenoxyacetamido)-3-acetoxymethyl-$\Delta^3$-cephem-4-carboxylate acid since its NMR spectrum was identical to that of a known sample of this compound, a known antibiotic, obtainable previously only from fermentation derived 7-ACA.

EXAMPLE 2

Preparation of delta-2 and delta-3 methyl 3-acetoxymethyl-7-phenoxyacetamido-2-cephem-4-carboxylic mixture In a 50 cc. round-bottom flask were placed 91 mg. (0.25 mole) of crystalline methyl 3-methyl-7-phenoxyacetamido-$\Delta^2$-cephem-4-carboxylate, 45 mg. (0.25 mmole) of N-bromosuccinimide, 7 mg. of azobisisobutyronitrile, and 15 cc. of CCl$_4$ in order to form methyl 3-bromomethyl-7-phenoxyacetamido-2-cephem-4-carboxylate. The mixture, protected from the light, was refluxed under nitrogen for 14 hours, cooled, filtered, and evaporated to dryness. To the residue were added 25 mg. (0.25 mmole) of potassium acetate and 15 cc. of acetone. The mixture, protected from the light, was refluxed under nitrogen for six hours and stirred at room temperature overnight. After the solution was evaporated to dryness, the residue was taken up in chloroform and filtered. Evaporation of solvent afforded 130 mg. of a golden oil.

Separation of the oil into its components by preparative thin-layer chromatography gave 11 mg. of recovered starting material and 70 mg. (65 percent yield) of a mixture of methyl 3-acetoxymethyl-7-phenoxyacetamido-$\Delta^2$-cephem-4-carboxylate and methyl 3-acetoxymethyl-7-phenoxyacetamido-$\Delta^3$-cephem-4-carboxylate (structure confirmed by NMR; $\Delta^2$:$\Delta^3$ ratio 3:1).

EXAMPLE 3

Preparation of mixture of delta-2 and delta-3 methyl 3-azidomethyl-7-phenoxyacetamidoceph-2-em-4-carboxylate The methyl 3-bromomethyl-7-phenoxyacetamido-2-cephem-4-carboxylate was prepared in the same manner as in Example 2. After evaporation of CCl$_4$ solvent, 16 mg. of sodium azide (0.25 mmole) and 15 cc. of acetone were added to the residue. The mixture was refluxed for six hours and then stirred overnight at room temperature. The acetone was evaporated and the residue taken up in chloroform and filtered. Removal of solvent gave 123 mg. of brown oil.

The brown, oily, crude product was purified by preparative thin-layer chromatography. In this manner there was obtained 79 mg. of material containing both starting material and the azido product (as indicated by I.R. spectrum). Examination by NMR and I.R. indicated that this material contained 16 percent starting material (1:1, $\Delta^2$-$\Delta^3$) plus the desired mixture of methyl 3-azidomethyl-7-phenoxyacetamido-$\Delta^2$-cephem-4-carboxylate and methyl 3-azidomethyl-7-phenoxyacetamido-$\Delta^3$-cephem-4-carboxylate (3:1, $\Delta^2$-$\Delta^3$) in 65 percent yield.

EXAMPLE 4

A solution of p-methoxybenzyl 7-phenoxyacetamido-3-bromomethyl-$\Delta^2$-cephem-4-carboxylate ester in dry benzene is mixed and stirred with a solution of 2 molar equivalents of anhydrous trimethylamine in dry benzene for 3 hours at room temperature. After this time the benzene solvent is removed by decantation from the precipitated product. The precipitated residue is dissolved in a 1:1 by volume water:acetone mixture and separated on an ion exchange column ("Dowex 1 x 1" in the acetate form). The first effluent fraction is lyophilized to obtain a glassy product which is a mixture of p-methoxybenzyl 7-phenoxyacetamido-3-(N,N,N-trimethylammoniummethyl)-$\Delta^2$-cephem-4-carboxylate ester and its $\Delta^3$-isomer, as the acetate salts.

EXAMPLE 5

Following the procedure of Example 4, a p-methoxybenzyl 7-(phenoxyacetamido)-3-(bromomethyl)-$\Delta^2$-cephem-4-carboxylate is reacted with methylamine to form p-methoxybenzyl 7-(phenoxyacetamido)-3-(N-methylamino-methyl)-$\Delta^2$-cephem-4-carboxylate ester product mixed with the corresponding $\Delta^3$-ester.

EXAMPLE 6

Following the procedure of Example 5, the product p-methoxybenzyl 7-(methylphenylacetamido)-3-[(N'-carboxamido)-hydrazinomethyl]-$\Delta^2$-cephem-4-carboxylate is prepared by reacting the ester p-methoxybenzyl 7-(p-methylphenylacetamido)-3-bromomethyl-2-cephem-4-carboxylate with 2 molar equivalents of semi-carbazide, H$_2$N—NH—C(O)NH$_2$.

This ester is converted to a useful antibiotic by treating the ester with a dilute base to form a mixture containing the antibiotic 7-(phenoxyacetamido)-3-[(N'-carboxamido)hydrazinomethyl]-$\Delta^3$-cephem-4-carboxylate ester, and removing the ester group by treating the ester mixture with the trifluoroacetic acid.

EXAMPLE 7

Following the procedure of Example 6, the following delta-2 functionalized cephalosporin esters are obtained from the indicated nucleophilic reagents:

Benzhydryl 7-(phenoxyacetamido)-3-(N-hydroxyaminomethyl)-$\Delta^2$-cephem-4-carboxylate from benzhydryl 7-(phenoxyacetamido-3-bromomethyl)-2-cephem-4-carboxylate and hydroxylamine;

p-Methoxybenzyl-7-(4'-methylphenoxyacetamido)-3-(hydrazinomethyl)-$\Delta^2$-cephem-4-carboxylate from p-methoxybenzyl 7-(4'-methylphenoxyacetamido)-3-(bromomethyl)-$\Delta^2$-cephem-4-carboxylate and hydrazine;

p-Methoxybenzyl 7-(4-methoxyphenylmercaptoacetamido)-3-[N-(4-methylpiperazino-1-aminomethyl)-$\Delta^2$-cephem-4-carboxylate from p-methoxybenzyl 7-(4-methoxyphenylmercaptoacetamido)-3-(bromomethyl)-$\Delta^2$-cephem-4-carboxylate and 1-amino-4-methylpiperazine;

Methoxybenzyl 7-(4'-nitrophenylacetamido)-3-(N-morpholinomethyl)-$\Delta^2$-cephem-4-carboxylate from bis(3,5-dimethoxyphenyl) methyl 7-(4'-nitrophenylacetamido)-3-bromomethyl-$\Delta^2$-cephem-4-carboxylate and morpholine, and t-Butyl 7-(4'-bromothiophene-2'-acetamido)-3-(N-methylanilinomethyl)-$\Delta^2$-cephem-4-carboxylate from t-butyl 7-(4'-bromothiopheneacetamido)-3-bromomethyl-$\Delta^2$-cephem-4-carboxylate and N-methylaniline.

Other nitrogen containing nucleophilic reagents which can be used to preper the $\Delta^2$-3-functionalized ester products according to the process of this invention include piperazine, imidazole, imidazoline, pyrrazole, and other compounds containing nucleophilic oxygen, sulfur, nitrogen or carbon atoms which compounds are disclosed in the prior art for making cephalosporin antibiotics.

EXAMPLE 8

A solution of p-methoxybenzyl 7-(phenoxyacetamido)-3-bromomethyl-$\Delta^2$-cephem-4-carboxylate in dry benzene is mixed with a benzene soluton of 2 molar equivalents of methylmercaptan. The mixture is stirred at room temperature for 3 hours to insure complete reaction. The reaction mixture is evaporated under vacuum to remove the solvent. The residue contained the crude product p-methoxybenzyl 7-(phenoxyacetamido)-3-(methylthiomethyl)-$\Delta^2$-cephem-4-carboxylate.

EXAMPLE 9

Following the procedure of Example 8, the following delta-2-(3-functionalized) cephalosporin esters are obtained from the indicated nucleophilic sulfur reagents;

4-methoxybenzyl 7-(phenoxyacetamido)-3-(phenylthiomethyl)-$\Delta^2$-cephem-4-carboxylate from 4-methoxybenzyl 7-(phenoxyacetamido)-3-bromomethyl-$\Delta^2$-cephem-4-carboxylate and thiophenol;

Benzhydryl 7-(phenyl-$\alpha,\alpha$-dimethylacetamido)-3-(mercaptomethyl)-$\Delta^2$-cephem-4-carboxylate from benzhydryl 7-(phenyl-$\alpha,\alpha$-dimethylacetamido)-3-(bromomethyl)-$\Delta^2$-cephem-4-carboxylate and hydrogen sulfide;

4 - methoxybenzyl 7 - (4' - nitrophenoxyacetamido)-3-(allylthiomethyl) - $\Delta^2$ - cephem - 4 - carboxylate from 4 - methoxybenzyl 7 - (4' - nitrophenoxyacetamido) - 3-bromomethyl - $\Delta^2$ - cephem - 4 - carboxylate and allylmercaptan;

Tert - butyl 7-[p-(t-butoxycarbamido)phenylmercaptoacetamido] - 3 - (carbomethoxymethylthiomethyl) - $\Delta^2$-cepham - 4 - carboxylate from tert-butyl 7-[p-(t-butoxycarbamido)phenylmercaptoacetamido] - 3 - bromomethyl - $\Delta^2$ - cephem - 4 - carboxylate and methyl thioglycolate;

Benzyl 7 - (3' - chlorophenoxyacetamido) - 3 - (N,N-dimethylaminoethylthiomethyl) - $\Delta^2$ - cephem - 4 - carboxylate from benzyl 7 - (3' - chlorophenoxyacetamido)-3-bromomethyl - $\Delta^2$ - cephem - 4 - carboxylate and N,N-dimethylaminoethyl mercaptan.

These $\Delta^2$ - 3 - functionalized - methyl cephalosporin esters are converted to a mixture containing antibiotically active $\Delta^3$-cephalosporanic acid derivatives by treatment of the $\Delta^2$ - cephalosporin esters with a dilute base such as triethylamine to form a mixture containing the $\Delta^3$-cephalosporin ester mixed with the corresponding $\Delta^2$-cephalosporin ester, and then treating the $\Delta^2,\Delta^3$-cephalosporin ester mixture with trifluoroacetic acid in benzene to form the corresponding $\Delta^2,\Delta^3$-cephalosporanic acid derivative mixture.

EXAMPLE 10

A solution of p-methoxybenzyl 7-(phenoxyacetamido)-3-bromomethyl - $\Delta^2$ - cephem - 4 - carboxylate in dry benzene is stirred while a thoroughly dried solution containing 1.1 molar equivalent of sodium N,N-dimethyldithiocarbamate suspended in benzene is added thereto. The mixture is stirred at room temperature for about 3 hours. The insoluble solids are removed by filtration and the benzene solution of the reaction product is concentrated to small volume and chromatographed over silica. Fracions of eluate containing p-methoxybenzyl 7-phenoxyacetamido - 3 - methyl - $\Delta^2$ - and $\Delta^3$-cephem-4-carboxylate ester are discarded, whereas eluate fractions containing p-methoxybenzyl 7 - (phenoxyacetamido - 3 - (N,N-dimethylaminothiocarbonylthiomethyl - $\Delta^2$ - cephem - 4-carboxylate ester are collected and concentrated to dryness. This product is converted to an equilibrium mixture containing the 7-phenoxyacetamido - 3 - N,N - dimethylaminothiocarbonylthiomethyl - $\Delta^3$ - cephem - 4-carboxylic acid by treating $\Delta^2$-ester with pyridine, to form an equilibrium mixture of the p-methoxybenzyl 7-phenoxyacetamido - 3 - N,N - dimethylaminothiocarbonylthiomethyl - $\Delta^2$- and $\Delta^3$ - cephem - 4 - carboxylate esters, and then treating this ester mixture with trifluoroacetic acid in benzene.

EXAMPLE 11

Following the procedure of Example 10, the following delta-2-(3 - functionalized)cephalosporin esters are obtained from the indicated nucleophilic reagents:

1,1-dimethylpropynyl 7 - (phenylmercaptoacetamido)-3 - (N' - methyl - N - piperazinothiocarbonylthiomethyl)-$\Delta^2$-cephem - 4 - carboxylate from 1,1 - dimethylpropynyl 7-(phenylmercaptoacetamido) - 3 - bromomethyl - $\Delta^2$- cephem - 4 - carboxylate and N - methylpiperazinodithiocarboxylate;

4 - methoxybenzyl 7 - (4' - nitrophenoxyacetamido)-3-(thioacetoxymethyl) - $\Delta^2$ -cephem - 4 - carboxylate from 4 - methoxybenzyl 7 - (4' - nitrophenoxyacetamido) - 3-bromomethyl - $\Delta^2$ - cephem - 4 - carboxylate and sodium thioacetate;

Tert - butyl 7 - (octanoylamido) - 3 - (benzoylthiomethyl) - $\Delta^2$ - cephem - 4 - carboxylate from tert-butyl 7 -(octanoylamido) - 3 - bromomethyl - $\Delta^2$ - cephem - 4 - carboxylate and potassium thiobenzoate;

4 - methoxy 7 - (phenoxyacetamido) - 3 - (picolinoylthiomethyl) - $\Delta^2$ - cephem - 4 - carboxylate from 4 - methoxybenzyl 7 - (phenoxyacetamido) - 3 - bromomethyl-$\Delta^2$-cephem-4-carboxylate and sodium thiopicolinate; and Benzhydryl 7-(phenyl - $\alpha,\alpha$ - dimethylacetamido)-3-[N-($\beta$-dimethylaminoethyl) - N - methylthiocarboxythiomethyl]-$\Delta^2$-cephem-4-carboxylate from benzhydryl 7-(phenyl-$\alpha,\alpha$-dimethylacetamido) - 3 - bromomethyl-$\Delta^2$-cephem-4-carboxylate and sodium N-($\beta$-dimethylaminoethyl)-N-methyldithiocarboxylate;

These $\Delta^2$-(3-functionalized-methyl)cephalosporin ester products of the process of this invention are readily converted to the corresponding $\Delta^3$-(3-functionalized-methyl) cephalosporanic acid derivative antibiotics by the procedure described in Example 10.

EXAMPLE 12

A solution of p-methoxybenzyl 7-(phenoxyacetamido)-3-bromomethyl-$\Delta^2$-cephem-4-carboxylate in dry benzene is treated with a dry benzene solution containing 1.1 molar equivalents of thiourea. After stirring for 5 hours at room temperature to insure complete reaction, 2 drops of tetramethylammonium hydroxide in methanol is added and the mixture is allowed to stand for 1 hour longer to obtain as product in crude mixture p-methoxybenzyl 7-(phenoxyacetamido)-3-formamidinothiomethyl-$\Delta^2$ and $\Delta^3$-cephem-4-carboxylate hydrobromide.

EXAMPLE 13

Following the procedures of Example 12, the thiourea is replaced with the following nucleophilic reagents to obtain the indicated products:

4-methoxybenzyl 7-(phenoxyacetamido)-3-(2'-pyrimidylthiomethyl)-$\Delta^2$-cephem-4-carboxylate from 2-mercaptopyrimidine, 4-methoxybenzyl 7-(phenoxyacetamido)-3-(2'-thiazolylthiomethyl)-$\Delta^2$-cephem-4-carboxylate from 2-mercaptothiazole, 4-methoxybenzyl 7-(phenoxyacetamido)-3-(2'-benzimidazolylthiomethyl)-$\Delta^2$-cephem-4-carboxylate from 2-mercaptobenzimidazole;

4-methoxybenzyl 7 - (phenoxyacetamido-3-(2'-pyridylthiomethyl)-$\Delta^2$-cephem - 4 - carboxylate from 2-mercaptopyridine;

4-methoxybenzyl 7-(phenoxyacetamido)-3-(2'-benzothiazolylthiomethyl)-$\Delta^2$-cephem-4-carboxylate from 2-mercaptobenzothiazole;

4-methoxybenzyl 7-(phenoxyacetamido)-3-(2'-imidazolylthiomethyl)-$\Delta^2$-cephem-4-carboxylate from 2-mercaptoimidazole;

4-methoxybenzyl 7-(phenoxyacetamido)-3-[3'-(1',3',4'-thiadiazolyl]thiomethyl-$\Delta^2$-cephem - 4 - carboxylate from 2-mercapto-1,3,4-thiadiazole;

4-methoxybenzyl 7-(phenoxyacetamido)-3-[2'-(1',3',4'-oxadiazolyl]thiomethyl-$\Delta^2$-cephem - 4 - carboxylate from 2-mercapto-1,3,4-oxadiazole; and 4-methoxybenzyl 7-(phenoxyacetamido)-3-(2'-pyrazylthiomethyl)-$\Delta^2$-cephem - 4 - carboxylate from 2-mercaptopyrazine;

These $\Delta^2$-cephalosporin ester products are useful as intermediates to the formation of the corresponding $\Delta^3$-sulfide-acid antibiotics by the equilibration/ester cleavage process described above.

EXAMPLE 14

A solution of 4-methoxybenzyl 7-(phenoxyacetamido)-3-bromomethyl-$\Delta^2$-cephem-4-carboxylate in dry acetonitrile is mixed with 1.1 molar equivalents of dry sodium nitrite and the mixture is stirred for 13 hours at room temperature to form 4-methoxybenzyl 7-(phenoxyacetamido)-3-(nitromethyl)-$\Delta^2$-cephem - 4 - carboxylate. This $\Delta^2$-cephalosporin ester when converted to the corresponding $\Delta^3$-cephalosporanic acid derivative shows antibiotic activity by a bioautograph procedure against S. lutea. The NMR of this product shows a 3'-methylene group.

EXAMPLE 15

By following the procedure of Example 14 and replacing the sodium nitrite with the indicated alkali metal, copper or silver salt nucleophiles, the following $\Delta^2$-cephalosporin 4-ester products are obtained;

4-methoxybenzyl 7 - (phenoxyacetamido)-3-cyanothiomethyl)-$\Delta^2$-cephem-4-carboxylate from sodium thiocyanate;

4-methoxybenzyl 7-(phenoxyacetamido)-3-(cyanomethyl)-$\Delta^2$-cephem-4-carboxylate from cuprous cyanide in dimethylsulfoxide and 4-methoxybenzyl 7-(phenoxyacetamido)-3-(cyanomethyl)-$\Delta^2$-cephem - 4 - carboxylate from silver cyanide.

These $\Delta^2$-cephalosporin-ester products of the process of this invention can be used as intermediates to the formation of the corresponding $\Delta^3$-cephalosporin-acid antibiotics, or salts of such acids by the procedures described in Example 1.

EXAMPLE 16

A mixture of 4-methoxybenzyl 7-phenoxyacetamido-3-bromomethyl-$\Delta^2$-cephem-4-carboxylate in dry benzene and 1.1 molar equivalents of pyridine is mixed at room temperature for five hours to form 4-methoxybenzyl 7-phenoxyacetamido - 3 - (1-pyridinomethyl)-$\Delta^2$-cephem-4-carboxylate hydrobromide. The $\Delta^2$-cephalosporin ester product is readily converted to a known $\Delta^3$-cephalosporanic acid derivative by procedures described above.

EXAMPLE 17

Aliquots of a solution of t-butyl 7-(phenoxyacetamido)-3-bromomethyl-$\Delta^2$-cephem-4-carboxylate in dry benzene are mixed with 1.1 molar equivalents of one of the amines listed below and stirred for 3 to 5 hours at room temperature to form the indicated cephalosporin ester salts:

t-Butyl 7 - (phenoxyacetamido)-3-(3'-picolino-1'-methyl)-$\Delta^2$-cephem-4-carboxylate bromide from 3-picoline;

t-Butyl 7-(phenoxyacetamido)-3-(4'-carbamyl-1'-pyridinomethyl)-$\Delta^2$-cephem-4-carboxylate bromide from isonicotinamide;

t-Butyl 7-(phenoxyacetamido)-3-(3'-carbamyl-1'-pyridinomethyl)-$\Delta^2$-cephem-4-carboxylate bromide from nicotinamide, t-Butyl 7-(phenoxyacetamido) - 3 - [3'-(N'-methylcarbamyl)-1-pyridino]methyl-$\Delta^2$-cephem-4-carboxylate bromide from N-methylnicotinamide;

t-Butyl 7-(phenoxyacetamido)-3-(3'-bromo-N-pyridinomethyl)-$\Delta^2$-cephem-4-carboxylate bromide from 3-bromopyridine;

t-Butyl 7 - (phenoxyacetamido) - 3 - (2',3'-dimethyl-N-pyridinomethyl)-$\Delta^2$-cephem-4-carboxylate bromide from 2,3-dimethylpyridine;

t-Butyl 7-(phenoxyacetamido) - 3 - (3'-carboxy-N-pyridinomethyl)-$\Delta^2$-cephem-4-carboxylate bromide from nicotinic acid;

t-Butyl 7-(phenoxyacetamido)-3-(4'-cyano-N-pyridinomethyl)-$\Delta^2$-cephem-4-carboxylate bromide from 4-cyanopyridine;

t-Butyl 7-(phenoxyacetamido) - 3 - (3'-sulfonamido-N-pyridinomethyl)-$\Delta^2$-cephem-4-carboxylate bromide from 3-sulfonamidopyridine;

t - Butyl 7 - (phenoxyacetamido) - 3-(1'-pyrimidinomethyl) - $\Delta^2$-cephem-4-carboxylate bromide from pyrimidine;

t - Butyl 7 - (phenoxyacetamido) - 3-(3'-thiazolylmethyl)-$\Delta^2$-cephem-4-carboxylate bromide from thiazole;

These $\Delta^2$-cephalosproin ester salt products, derivable from penicillin V by the Morin-Jackson process or by that process as improved by the Chauvette-Flynn and R. D. G. Cooper inventions, and converted to 3-functionalized products by the process of this invention, can be converted to antibiotic materials by the procedures described above.

EXAMPLE 18

Following the procedure described in Example 1, the potassium acetate used therein is replaced with other oxygen containing nucleophilic reagents to form the indicated $\Delta^2$-cephalosporin-ester products from the phthalimido- methyl or succinimidomethyl 7-(phenoxyacetamindo)-3-bromomethyl-$\Delta^2$-cephem-4-carboxylate intermediate to obtain the following 3-functionalized cephalosporin products:

Phthalimidomethyl 7-(phenoxyacetamido)-3-(benzoyloxymethyl)-$\Delta^2$-cephem-4-carboxylate from sodium benzoate;

Succinimidomethyl 7 - (phenoxyacetamido)-3-(phenylacetoxymethyl) - $\Delta^2$ - cephem-4-carboxylate from sodium phenylacetate;

Phthalimidomethyl 7 - (phenoxyacetamido) - 3-(thiophene - 2 - carboxymethyl) - $\Delta^2$ - cephem-4-carboxylate from sodium thiophene-2-carboxylate;

Succinimidomethyl 7 - (phenoxyacetamido)-3-(indole-2 - acetoxymethyl)-$\Delta^2$-cephem-4-carboxylate from sodium 2-indoleacetate;

Phthalimidomethyl 7 - (phenoxyacetamido) - 3-(carbomethoxycarboxymethyl) - $\Delta^2$ - cephem - 4-carboxylate from sodium methyl oxalate;

Succinimidomethyl 7 - (phenoxyacetamido) - 3-(hydroxymethyl) - $\Delta^2$ - cephem-4-carboxylate from water;

Phthalimidomethyl 7 - (phenoxyacetamido) - 3-(methoxycarbonyloxymethyl) - $\Delta^2$ - cephem-4-carboxylate from sodium methylcarbonate;

Succinimidomethyl 7 - (phenoxyacetamido)-3-(methylthiocarbonyloxymethyl) - $\Delta^2$ - cephem-4-carboxylate from sodium S-methyl monothiocarbonate.

The $\Delta^2$-cephalosporin-ester products are converted to $\Delta^2$-cephalosporin-acid antibiotics by the equilibration deesterification procedure described above or by the oxidation reduction procedures above.

EXAMPLE 19

To 1 molar equivalent of 4-methoxybenzyl 7-(phenoxyacetamido) - 3 - bromomethyl-$\Delta^2$-cephem-4-carboxylate dissolved in absolute methanol there was added 2 molar equivalents of anhydrous powdered calcium carbonate. The mixture was stirred at room temperature for 24 hours to insure complete reaction, filtered, and the filtrate evaporated to dryness. The residue containing the 4-methoxybenzyl 7 - (phenoxyacetamido)-3-methoxymethyl-$\Delta^2$-cephem-4-carboxylate product was dissolved in benzene. A small amount of pyridine was added to the benzene solution to equilibrate the double bond to form a mixture of the $\Delta^2$ and $\Delta^3$-cephalosporin-ester product. After several hours, trifluoroacetic acid in molar excess to the product in anisole were added and the mixture was stirred for 2 hours to form the antibiotically active 7-phenoxyacetamido - 3 - methoxymethyl - $\Delta^3$-cephem-4-carboxylic acid in admixture with 7-phenoxyacetamido-3-methoxymethyl-$\Delta^2$-cephem-4-carboxylic acid.

EXAMPLE 20

Following the procedure of Example 19, except that the oxygen nucleophilic reagents are changed, the following $\Delta^2$-cephalosporin-ester products are obtained from the indicated nucleophilic reagents:

4 - methoxybenzyl 7 - (phenoxyacetamido)-3-(thiophene - 2 - methoxymethyl) - $\Delta^2$-cephem-4-carboxylate from thiophene-2-carbinol;

4 - methoxybenzyl 7 - (phenoxyacetamido)-3-(4-[t-butoxy - carbonyl - piperidinyl]oxymethyl)-$\Delta^2$-cephem-4-carboxylate from 4-hydroxypiperidine N-t-butyl carbamate;

4 - methoxybenzyl 7-(phenoxyacetamido)-3-(diphenylmethylideneaminooxymethyl - $\Delta^2$ - cephem-4-carboxylate from benzophenone oxime; and 4 - methoxybenzyl 7 - (phenoxyacetamido) - 3-(isopropylideneaminooxymethyl) - $\Delta^2$ - cephem - 4 - carboxylate from acetone oxime.

The $\Delta^2$-cephalosporin ester derivatives are readily converted to the corresponding $\Delta^3$sulfide-acid antibiotics by the procedures described above in Example 1 for sulfoxide formation and reduction followed by ester cleavage.

EXAMPLE 21

Esterification

To a stirred suspension of 6.98 g. (0.002 mole) of $\Delta^2$ desacetoxy ceph V acid [3-methyl-7-(phenoxyacetamido)-$\Delta^2$-cephem-4-carboxylic acid] and 2.8 g. (0.002 mole) of 4-methoxybenzyl alcohol in 100 cc. of methylene chloride was added a solution of 4.62 g. of dimethylformamide dineopentyl acetal in 25 cc. of methylene chloride. Dissolution was complete in a few minutes. The reaction mixture was stirred for 48 hours at room temperature to insure complete reaction. The solvent was removed, and benzene was added. The resulting solution was washed three times with aqueous sodium bicarbonate solution, twice with aqueous sodium chloride solution, dried over magnesium sulfate, filtered and evaporated. The residue was crystallized from carbon tetrachloride to give 6.74 g. (92 percent yield from unrecovered $\Delta^2$ acid) of the 4-methoxybenzyl 3-methyl-7-phenoxyacetamido-$\Delta^2$ cephem-4-carboxylate ester, M.P. 108–112° C.

The aqueous sodium bicarbonate spent liquors were layered with ethyl acetate, cooled, and adjusted to pH 2.5. The organic layer yield 1.56 g. of colorless, crystalline 3-methyl-7-phenoxyacetamido - $\Delta^2$ - cephem 4 carboxylic acid, which could be reused in the esterification process.

Functionalization of 3-methyl group

A 1.17 g. portion of 4-methoxybenzyl 3-methyl-7-phenoxy-acetamido-$\Delta^2$-cephem-4-carboxylate ester was treated with N-bromosuccinimide in carbon tetrachloride in the presence of azobisisobutyronitrile to form 4-methoxybenzyl 3-bromomethyl-7-phenoxyacetamido-$\Delta^2$-cephem-4-carboxylate ester. This $\Delta^2$-allylic bromide-ester was dissolved in 100 cc. of absolute methanol containing 2 molar equivalents of N,N-diethyl aniline to absorb hydrogen bromide by-product. This mixture was stirred at room temperature for 24 hours to insure complete reaction, and then evaporated to dryness, taken up in benzene, extracted twice with cold 5 percent hydrochloric acid solution, sodium bicarbonate solution, sodium chloride solution, dried over magnesium sulfate, filtered and evaporated to give 970 mg. of a brown oil. This brown oil was chromatographed over a column of silica gel containing 15 percent water, using a mixture of benzene and ethyl acetate as eluate. A benzene solution containing about 4 percent ethyl acetate eluted about 15 percent unreacted desacetoxy starting material. A benzene solution containing about 8 percent ethyl acetate eluted the 4-methoxybenzyl 3-methoxymethyl - 7 - phenoxyacetamido - $\Delta^2$ - cephem - 4 - carboxylate ester, M.P. 116–118, from methanol, in 40 percent yield. The structure was confirmed by nuclear magnetic resonance spectrum and elemental analysis.

Sulfoxide formation

To a cooled solution of 215 mg. of the 4-methoxybenzyl 3-methoxymethyl-7-phenoxyacetamido- $\Delta^2$ -cephem-4-carboxylate ester product of this invention in 5 cc. of chloroform, there was added a solution of 85 mg. of m-chloroperbenzoic acid (88 percent pure) in chloroform. The mixture was stirred and allowed to warm slowly over 1 hour. The chloroform was washed with sodium bicarbonate solution, sodium chloride solution, dried over magnesium sulfate, filtered, and evaporated. The solid residue was crystallized from benzene containing methylene chloride to give 82 mg. of 4-methoxybenzyl 3-methoxymethyl-7 - phenoxyacetamido- $\Delta^3$ -cephem-4-carboxylate-1-oxide, M.P. 183–185° C., which gave a satisfactory elemental analysis.

Further experiments have shown that hydroxylic solvents such as isopropanol or tert-butanol give better yields than chloroform in this reaction.

Reduction of sulfoxide

To a solution of 1.028 g. (0.002 mole) of the 4-methoxybenzyl 3 - methoxymethyl-7-phenoxyacetamido-$\Delta^3$-cephem-4-carboxylate-1-oxide in 75 cc. of dry dimethyl-formamide was added 15 cc. of acetyl chloride and then 6 g. of sodium dithionite ($Na_2S_2O_4$). After stirring at room temperature for 4 hours, the resulting mixture was cooled and benzene and aqueous sodium bicarbonate solution were added. After decomposition of the excess acetyl chloride was completed, water was added, and the mixture was extracted twice with benzene. The combined benzene extracts were washed with aqueous sodium bicarbonate solution, and then with sodium chloride solution, and then dried over magnesium sulfate, filtered, and evaporated to give 1.32 g. of crude dark brown semi-solid 4-methoxybenzyl 3-methoxymethyl-7-phenoxyacetamido-$\Delta^3$-cephem-4-carboxylate.

This crude $\Delta^3$-cephalosporin ester was purified by column chromatography and eluted from a silica gel-15 percent water column using benzene-5 percent ethyl acetate as eluate. There was obtained 300 mg. of 4-methoxybenzyl 3-methoxymethyl-7-phenoxyacetamido- $\Delta^3$ -cephem-4-carboxylate, M.P. 116–117.5° C., after crystallization from ethyl ether. This assigned structure was verified by NMR and elemental analysis.

Ester removal

To a solution of 174 mg. of 4-methoxybenzyl 3-methoxy - methyl - 7-phenoxyacetamido-$\Delta^3$-cephem-4-carboxylate and 119 mg. of anisole in 25 cc. of dry benzene there was added 1.25 cc. of trifluoroacetic acid. After stirring for 2 hours at room temperature, the reaction mixture was evaporated, the residue was taken up in ethyl acetate, and the resulting ethyl acetate mixture was extracted three times with aqueous sodium bicarbonate solution. The aqueous bicarbonate extracts were cooled, layered with ethyl acetate and acidified to pH 2.8. From the ethyl acetate layer was obtained by evaporation 140 mg. of a foam, which gave 86 mg. of 3-methoxymethyl-7-phenoxyacetamido-$\Delta^3$-cephem-4-carboxylic acid, M.P. 135–137° C., after crystallization from ether. This acid gave an antibiotically active zone on a bioautogram of its paper chromatogram. The spot for the derivative was slightly slower moving than that of desacetoxyceph V.

EXAMPLE 22 p-Methoxybenzyl 3-cyanomethyl-7-phenoxyacetamido-$\Delta^2$-cephem-4-carboxylate A portion of crude p-methoxybenzyl 3-bromomethyl-7-phenoxyacetamido - $\Delta^2$ - cephem-4-carboxylate obtained from 585 mg. of the corresponding p-methoxybenzyl 3-methyl-7-phenoxyacetamido- $\Delta^2$ -cephalosporanate ester was dissolved in 10 cc. of dry dimethylsulfoxide and added to a suspension of 55 mg. of cuprous cyanide (0.5 molar equivalents for starting material) in 5 cc. of dimethylsulfoxide. The mixture was stirred for 6 hours at room temperature. Benzene was then added and extractions of the resulting mixture were made as follows: 3 times with aqueous sodium chloride solution, 2 times with cold aqueous 5 percent hydrochloric acid solution, 2 times with aqueous sodium bicarbonate solution, 2 times with aqueous sodium chloride solution. The residue was dried over anhydrous magnesium sulfate, filtered, and evaporated to give 392 mg. of crude product.

This crude product was applied to a silica gel-15 percent $H_2O$ column. Starting p-methoxybenzyl 3-methyl-7-phenoxyacetamido-$\Delta^2$-cephem - 4 - carboxylate ester was eluted with benzene-2 percent ethyl acetate and benzene-4 percent ethyl acetate mixtures. Benzene-4 percent ethyl acetate and benzene-8 percent ethyl acetate mixtures eluted the desired p-methoxybenzyl 3 - cyanomethyl-7-phenoxyacetamido-$\Delta^2$-cephem - 4 - carboxylate which crystallized from ethyl ether, M.P. 119–120° C. The structure of this desired product was confirmed by NMR, mass spectrometry, and elemental analysis.

4-methoxybenzyl 3-cyanomethyl-7-phenoxyacetamido-$\Delta^3$-cephem-4-carboxylate-1-oxide To a solution of 372 mg. of 4-methoxybenzyl 3-cyanomethyl-7-phenoxyacetamido-$\Delta^2$-cephem-4 - carboxylate in 300 cc. of isopropylalcohol there was added a solution of 133 mg. of metachloroperbenzoic acid in isopropyl alcohol. This mixture was stirred over night at room temperature. The sulfoxide which precipitated, 4-methoxybenzyl 3-cyanomethyl-7-phenoxyacetamido - $\Delta^3$ - cephem-4-carboxylate-1-oxide, (210 mg.—M.P. 204–207° C.) was collected by suction filtration. The filtrate was evaporated to dryness. The residue was taken up in ethyl acetate, washed with aqueous sodium bicarbonate solution, then with aqueous sodium chloride solution, and dried over magnesium sulfate, and then filtered and evaporated to give 160 mg. of an oil from which 45 mg. of additional $\Delta^3$-sulfoxide ester crystallized after methanol was added. The structure of the 4-methoxybenzyl 3-cyanomethyl-7-phenoxyacetamido-$\Delta^3$-cephem - 4 - carboxylate-1-oxide was verified by spectroscopic methods.

4-methoxybenzyl 3-cyanomethyl-7-phenoxyacetamido-$\Delta^3$-cephem-4-carboxylate To a solution of 400 mg. of the 4-methoxybenzyl 3-cyano-methyl-7-phenoxyacetamido-$\Delta^3$-cephem-4 - carboxylate 1-oxide, prepared as described above, in 25 cc. of dry dimethylformamide there was added 1.6 gm. of sodium dithionite ($Na_2S_2O_4$). The mixture was cooled in an ice-water bath, and 4.5 cc. of acetyl chloride was added. The mixture was stirred in the cold bath for 1 hour and then poured into a cold aqueous sodium bicarbonate solution-benzene mixture. After the excess acetyl chloride was completely decomposed, more benzene was added, and the mixture was washed with aqueous sodium bicarbonate and then with aqueous sodium chloride solution, dried over magnesium sulfate, filtered and evaporated to give 620 mg. of crude 4-methoxybenzyl 3-cyano-methyl-7-phenoxyacetamido-$\Delta^3$-cephem-4-carboxylate product.

This crude product was applied to a column of 40 gm. of silica gel-15 percent water. The pure 4-methoxybenzyl 3-cyanomethyl-7-phenoxyacetamido - $\Delta^3$-cephem - 4 - carboxylate was eluted with a benzene-4 percent ethyl acetate mixture and crystallized from ethyl ether. It had a melting point of 145–147° C. The structure was confirmed by spectroscopic methods.

The 4-methoxybenzyl 3 - cyanomethyl-7-phenoxyacetamido-$\Delta^3$-cephem-4-carboxylate was treated with a molar excess of trifluoroacetic acid in benzene solution at room temperature for 2 hours to form the corresponding 3-cyanomethyl - 7 - phenoxyacetamido-$\Delta^3$-cephem - 4 - carboxylic acid which is antibiotically active against *Bacillus subtilis* as shown by a bioautogram of its paper chromatogram.

EXAMPLE 23

Preparation of t-butyl 7-(phenoxyacetamido)-3-bromomethyl-$\Delta^2$-cephem-4-carboxylate A solution of 8.08 g. (20 mmoles) of 4-t-butyl 7-(phenoxyacetamido)-3-methyl-$\Delta^2$-cephem-4-carboxylate, 5.0 g. N-bromosuccinimide, and 50 mg. azobisisobutyronitrile in 800 ml. of carbon tetrachloride was refluxed under nitrogen until a negative starch iodide test was obtained (5 hr.). The reaction mixture was cooled, the succinimide removed by filtration and the solvent removed under reduced pressure to give 11.8 g. crude product. An NMR spectrum showed only the tert-butyl 7-phenoxyacetamido-3 - bromomethyl-$\Delta^2$-cephem-4-carboxylate contaminated with traces of succinimide (yield >90 percent).

EXAMPLE 24

Tert-butyl 7-phenoxyacetamido-3-isopropoxy methyl-$\Delta^2$-cephem-4-carboxylate A solution of 3.51 g. of 4-tert-butyl 7-(phenoxyacetamido)-3-bromomethyl-$\Delta^2$-cephem-4 - carboxylate prepared as described in Example 23 in 100 ml. of isopropanol was warmed on a steam bath to about 70° C. for 20 minutes. The excess isopropanol was removed under reduced pressure. The residue was dissolved in benzene, was washed with aqueous 5 percent sodium bicarbonate solution, then with water, dried over sodium sulfate, and evaporated to dryness to give 2.32 g. of crude tert-butyl 7-phenoxyacetamido-3-isopropoxymethyl - $\Delta^2$ - cephem-4-carboxylate as product. Spectral analyses verified the structure.

EXAMPLE 25

Tert-butyl 7-phenoxyacetamido-3-tert-butoxymethyl-$\Delta^2$-cephem-4-carboxylate A solution of 1.00 g. of tert-butyl 7-phenoxyacetamido-3 - bromomethyl-$\Delta^2$-cephem-4-carboxylate in 50 ml. of tert-butyl alcohol was stirred at reflux (about 83° C.) for 90 minutes. The alcohol solvent was then removed under reduced pressure and the residue was dissolved in ethyl acetate. The ethyl acetate solution was warmed, treated with decolorizing charcoal, filtered, and evaporated to dryness to give 1.36 g. of crude tert-butyl 7-phenoxyactamido-3-tert-butoxymethyl - $\Delta^2$ - cephem-4-carboxylate product. The crude product was chromatographed over 75 g. of a silica gel, 15 percent water to give 0.563 g. of the tert-butyl 7 - phenoxyacetamido - 3 - tert-butoxymethyl-$\Delta^2$-cephem-4-carboxylate product in the eluate from 10 percent ethyl acetate in benzene elution. The product structure was confirmed by spectral data.

EXAMPLE 26

The tert-butyl 7 - phenoxyacetamido-3-cyclopentyloxymethyl-$\Delta^2$-cephem-4-carboxylate was prepared by warming tert-butyl 7-phenoxyacetamido - 3 - bromomethyl-$\Delta^2$-cephem-4-carboxylate in excess cyclopentyl alcohol as described in Example 24.

Similar 3-oxy-ether-$\Delta^2$-cephalosporin ester compounds are prepared by warming the appropriate 7-acylamido-3-bromomethyl-$\Delta^2$-cephem-4-carboxylate mixed with a stoichiometric excess of the desired primary, secondary or tertiary alcohol.

EXAMPLE 27

Oxidation

Using the tert-butyl 7-phenoxyacetamido-3-isopropoxymethyl-$\Delta^2$-cephem-4-carboxylate ester as an illustration, this example shows how the 3-oxy-ether-$\Delta^2$-cephalosporin ester compounds described above can be oxidized to the corresponding $\Delta^3$-cephem-1-oxide esters, reduced to the corresponding $\Delta^3$-cephem esters, and deesterified to form the $\Delta^3$-cephem acid antibiotics.

Crude tert-butyl 7-phenoxyacetamido-3 - isopropoxymethyl-$\Delta^2$-cephem-4-carboxylate ester (2.32 g.), from above, was dissolved in a mixture of methylene chloride and 50 ml. of isopropanol and stirred at ice temperature while a solution of 1.00 g. of m-chloroperbenzoic acid in 50 ml. of methylene chloride was added dropwise. Upon completing the addition, the solvent was removed under reduced pressure. The residue was dissolevd in ethyl acetate, washed with aqueous 5 percent sodium bicarbonate solution, dried over sodium sulfate and evaporated to dryness to give 2.16 g. of the crude sulfoxide ester tert-butyl 7-phenoxyacetamido-3-isopropoxymethyl-$\Delta^3$ - cephem-4-carboxylate-1-oxide. The crude sulfoxide ester was chromatographed over 200 g. of silica gel-15 percent water to give 1.10 g. of the pure sulfoxide ester in 40 percent ethyl acetate-60 percent benzene mixture. The structure of the pure sulfoxide ester was verified with spectral data.

Reduction

A solution of 0.891 g. of the sulfoxide ester tert-butyl 7-phenoxyacetamido-3-isopropoxymethyl-$\Delta^3$ - cephem - 4-carboxylate-1-oxide, 0.71 g. of stannous chloride, 0.5 ml. of acetyl chloride, 15 ml. acetonitrile, and 5 ml. of dimethylformamide was stirred at 25° C. for 2 hours. The solvents were removed under reduced pressure and the residue was suspended in ethyl acetate. The ethyl acetate suspension was washed twice with aqueous 3 percent hydrochloric acid solution, aqueous 5 percent sodium bicarbonate solution, then with water, dried over sodium sulfate, and evaporated to dryness to give 0.781 g. of the reduced (sulfide) ester, tert-butyl 7-phenoxyacetamido-3-isopropoxymethyl-$\Delta^3$-cephem-4-carboxylate. Spectral analyses verified the structure.

De-esterification

A soluiton of 0.156 g. of the tert-butyl 7-phenoxyacetamido-3-isopropoxymethyl-$\Delta^3$-cephem-4-carboxylate ester in 7 ml. of 98 percent formic acid and water was stirred at 25° C. for 25 hours to insure complete reaction. The reaction mixture was poured into water and extracted with ethyl acetate. The ethyl acetate solution was washed with water and then extracted with aqueous 5 percent sodium bicarbonate solution. The resulting solution was acidified with aqueous 3 percent hydrochloric acid and extracted with ethyl acetate. The resulting ethyl acetate solution was dried over sodium sulfate and evaporated to dryness to give 0.088 g. of the free acid, 7-phenoxyacetamido-3-isopropoxymethyl-$\Delta^3$-cephem-4-carboxylic acid, which is an active antibiotic against a group of pencillin sensitive and resistant staphylococci in an in vitro test.

EXAMPLES 28 to 50

Following the procedures described above, the following additional 3-oxymethyl-$\Delta^2$-cephem-4-carboxylate esters were made by dissolving and warming tert-butyl 7-phenoxyacetamido-3-bromomethyl-$\Delta^2$-cephem - 4 - carboxylate in excess of the indicated alcohol.

(28) Tert-butyl 7-phenoxyacetamido - 3 - benzyloxymethyl-$\Delta^2$-cephem-4-carboxylate from benzyl alcohol;
(29) Tert-butyl 7-phenoxyacetamido-3-(1'-cyclohexylmethoxy)methyl-$\Delta^2$-cephem-4 - carboxylate from cyclohexylmethanol;
(30) Tert-butyl 7-phenoxyacetamido-3-n-butoxymethyl-$\Delta^2$-cephem-4-carboxylate from n-butanol;
(31) Tert-butyl 7-phenoxyacetamido-3-(2'-tetrahydrofurylmethoxy)methyl-$\Delta^2$-cephem-4-carboxylate from 2-tetrahydrofurylmethanol;
(32) Tert-butyl 7-phenoxyacetamido-3-(acetylmethoxy)methyl-$\Delta^2$-cephem-4 - carboxylate from $\alpha$ - hydroxyacetone;
(33) Tert-butyl 7-phenoxyacetamido-3-(2' - methoxyethoxy)methyl-$\Delta^2$-cephem-4-carboxylate from 2-methoxyethanol;
(34) Tert-butyl 7-phenoxyacetamido-3-(p - methoxybenzyloxy)methyl-$\Delta^2$-cephem-4-carboxylate from p-methoxybenzyl alcohol;
(35) Tert-butyl 7-phenoxyacetamido-3 - propargyloxymethyl-$\Delta^2$-cephem-4-carboxylate from propargyl alcohol;
(36) Tert-butyl 7-phenoxyacetamido-3-(2' - trifluoroethoxy)methyl-$\Delta^2$-cephem-4-carboxylate from 2,2,2 - trifluoroethanol;
(37) Tert-butyl 7-phenoxyacetamido-3 - (carboethoxymethoxy)methyl-$\Delta^2$-cephem-4-carboxylate from ethyl $\alpha$-hydroxyacetate;
(38) Tert-butyl 7-phenoxyacetamido-3-(2'-acetoxyethoxy)methyl-$\Delta^2$-cephem-4-carboxylate from 2-acetoxyethanol;
(39) Tert-butyl 7-phenoxyacetamido-3-(2 - bromoethoxy)methyl-$\Delta^2$-cephem-4-carboxylate from 2-bromoethanol;
(40) Tert-butyl-7-phenoxyacetamido-3 - (3'-bromopropoxy)methyl-$\Delta^2$-cephem-4-carboxylate from 3-bromo-n-propanol;
(41) Tert-butyl 7-phenoxyacetamido-3-(2' - allyloxy)-methyl-$\Delta^2$-cephem-4-carboxylate from allyl alcohol;
(42) Tert-butyl 7-phenoxyacetamido-3-(2'-methylthioethoxy)methyl-$\Delta^2$-cephem-4-carboxylate from 2-methylthioethanol;
(43) Tert-butyl 7-phenoxyacetamido-3-(4' - nitrophenoxy)methyl-$\Delta^2$-cephem - 4 - carboxylate from 4-nitrophenol;
(44) Tert-butyl 7-phenoxyacetamido-3-phenoxymethyl-$\Delta^2$-cephem-4-carboxylate from phenol;
(45) Tert-butyl 7-phenoxyacetamido-3-(4'-methylphenoxy)methyl-$\Delta^2$-cephem-4 - carboxylate from p - methylphenol;
(46) Tert-butyl 7-phenoxyacetamido-3-(2' - cyanoethoxymethyl)-$\Delta^2$-cephem-4-carboxylate from 2 - cyanoethanol;
(47) Tert-butyl 7-phenoxyacetamido-3-(3'-tertrahydrofuryloxymethyl)-$\Delta^2$-cephem-4-carboxylate from 3-furyl alcohol;
(48) Tert-butyl 7-phenoxyacetamido-3-[1'-(carboethoxy)-ethoxy]-$\Delta^2$-cephem-4-carboxylate from ethyl 2-hydroxypropionate;
(49) Tert-butyl 7-phenoxyacetamido-3-(2'-chloroallyloxymethyl)-$\Delta_2$-cephem-4-carboxylate from 2-chloroallyl alcohol;
(50) Tert - butyl 7 - phenoxyacetamideo-3-(2'-thienylmethoxy)-methyl-$\Delta^2$-cephem-4-carboxylate from 2'-thienylmethanol.

The table which follows gives the NMR data pertinent to the 3'-group in some of the nef compounds of this invention. The data is given in (delta), parts per million (p.p.m.) units relative to tetramethylsilane in deuteriochloroform as a solvent. The data is presented as follows:

(a)=chemical shift p.p.m. ( )
(b)=description of peaks on spectrum
    s=singlet
    d=doublet
    t=triplet
    m=multiplet
    q=quartet
(c)=number of protons The first group of compounds were tert-butyl 7-phenoxyacetamido-3-oxymethyl ether-$\Delta^2$-cephem-4-carboxylate esters of the formula

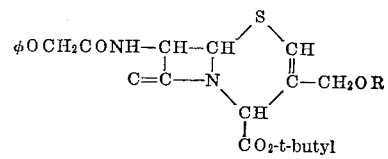

where R varied as indicated:

| Compound (R) | 3-methylene | Attached to 3-methylene |
|---|---|---|
| —H | 4.20 (s) | 2.85 (s) (1). |
| —CH$_3$ | 4.0 (d) | 3.29 (s) (3). |
| —CH$_2$CH$_3$ | 3.92 (s) | 3.30 (q) (2), 1.2 (t) (3). |
| —CH(CH$_3$)$_2$ | 4.05 (s) | 3.60 (m) (1), 1.18 (d) (6) |
| —C(CH$_3$)$_3$ | 3.95 (s) | 1.20 (s) (9). |
| —CH$_2$—C$_6$H$_5$ | 4.10 (q) | 4.50 (s) (2), 7.35 (s) (5). |
| —CH$_2$CH$_2$OCOCH$_3$ | 4.20 (m) | 3.60 (t) (2), 4.20 (t) (2), 2.10 (s) (3). |
| —CH$_2$CH$_2$CN | 4.12 (q) | 3.60 (t) (2), 2.60 (t) (2). |
| —CH$_2$CH$_2$OCH$_3$ | 4.20 (q) | 3.30 (s) (4), 3.45 (s) (3). |
|  | 4.0-4.2 (m) | 4.2 (m) (1). |

TABLE—Continued

| Compound (R) | 3-methylene | Attached to 3-methylene |
|---|---|---|
| —CH₂CH₂CH₂CH₃ | 4.0 (q) | 0.90 (t) (3); 1.50 (m) (4); 3.30 (q) (2). |
| —CH₂—furfuryl | 4.10 (m) | 1.8 (m) (4); 3.30 (d) (2); 3.8 (m) (3). |
| —CH₂CH₂SCH₃ | 3.80 (m) | 2.1 (s) (3); 3.6 (m) (4). |
| —CH₂COOCH₂CH₃ | 4.20 (m) | 1.25 (t) (3); 4.01 (s) (2); 4.2 (q) (2). |
| —CH₂COCH₃ | 4.12 (q) | 2.15 (s) (3); 4.00 (s) (2). |
| —CH₂CH₂Br | 4.10 (q) | 3.3–3.9 (m) (4). |
| —CH₂=CH | 4.17 (s) | 2.5 (t) (1); 4.10 (d) (2). |
| —CH₂C₆H₅ | 4.0 (q) | 3.2 (2) (d), 1.0–1.9 (m). |
| —CH₂CH=CH₂ | 4.0 (m) | 4.0 (m) (2); 5.0–5.5 (m) (3). |
| —CH₂CH₂CH₂Br | 4.10 (m) | 2.0 (m) (2); 3.3–3.8 (m) (4). |
| —CH—COOCH₂CH₃<br>    \|<br>    CH₃ | 4.10 (m) | 1.0–1.5 (m) (6); 4.2 (m) (3). |
| —C₆H₅ | 3.41 (s) | 6.7–7.4 (m). |

Additional compounds of the formula

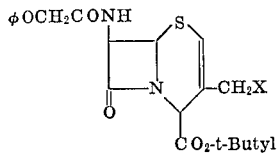

where X is as defined below, were also made and analyzed by NMR spectral methods.

| Compound X | 3-methylene | X |
|---|---|---|
| —Br | 4.20 (q) | |
| —SCH₃ | 3.30 (m) | 1.98 (s) (3) |
| —N(CH₃)₂ | 3.20 (m) | 2.2 (s) (6) |
| —CN | | 2.01 (s) |

EXAMPLE 51

Preparation of t-butyl 7-(phenoxyacetamido)-3-hydroxymethyl-Δ²-cephem-4-carboxylate The tert-butyl 7-phenoxyacetamido-3-bromomethyl-Δ²-cephem-4-carboxylate derived from 20 mmoles of 4-t-butyl-7-phenoxyacetmadio-3-methyl-Δ²-cephem carboxylate (prepared as above) was dissolved in 200 ml. of benzene and 200 ml. of dimethylsulfoxide and 5 ml. of water were added. The reaction mixture was stirred at 25° for 20 hours. The reaction mixture was then poured into 1000 ml. of water containing 20 g. sodium chloride. The benzene layer which separated from the water was then washed four times with water, twice with aqueous 5 percent sodium bicarbonate solution, dried over sodium sulfate, and evaporated to dryness. The residue crystallized from benzene as prisms (3.90 g., 46 percent) M.P. 118–120°. Spectral data verified the proposed structure.

In further experiments with this reaction it has been found that with a 50:50 v./v. mixture of benzene and dimethylsulfoxide as a diluent for the reaction of these 7-acylamido-3-bromomethyl-Δ²-cephem - 4 - carboxylate esters with water better yields are obtained, although good yields are obtained with mixtures of benzene with from 25–75 percent dimethylsulfoxide. Also experiments followed by thin layer chromatography indicate that tetrahydrofuran, acetonitrile, ethyl acetate, nitromethane, acetone, dioxane, methyl chloride and similar organic diluents can substitute for the benzene, and that dimethylformamide, and hexamethylphosphoramido can substitute for the dimethylsulfoxide.

Similar 3-hydroxymethyl compounds have been prepared by reacting water with 7-phenoxyacetamido-3-bromomethyl-Δ²-cephem-4-carboxylates where the ester group was p-methoxybenzyl, tert-butyl, p-nitrobenzyl, and 1,1-dimethyl-2-propynyl.

The 3-hydroxymethyl compounds, prepared as described above, can be used to form the corresponding 3-acyloxymethyl-Δ²-cephem esters by reaction with an alkanoic acid anhydride, e.g., acetic anhydride and then can be converted to known antibiotic compounds by the oxidation-reduction-de-esterification procedure described above.

EXAMPLE 52

Preparation of t-butyl 7-(phenoxyacetamido)-3-dimethylaminomethyl-Δ²-cephem-4-carboxylate To a solution of crude Δ²-bromide, tert-butyl 7-phenoxyacetamido-3-bromomethyl-Δ²-cephem-4 - carboxylate, in 50 ml. of ethyl ether was added about 5 ml. of dimethylamine in 20 ml. of ether at ice temperature. The reaction mixture was stirred at 0° for 3 hours. The solvent was removed under reduced pressure and the residue suspended in ethyl acetate. The ethyl acetate solution was washed twice with aqueous 5 percent sodium bicarbonate solution, then extracted with 3 percent hydrochloric acid. The acidic solution was made basic with 5 percent sodium bicarbonate then extracted with ethyl acetate. The ethyl acetate solution was dried over anhydrous potassium carbonate and evaporated to dryness to give 2.3 g. crude product. An NMR spectrum showed pure dimethylamine derivative, tert-butyl 7-phenoxyacetamido - 3 - (N,N - dimethylaminomethyl)-Δ²-cephem-4-carboxylate.

EXAMPLE 53

A solution of tert-butyl 7-phenoxyacetamido-3-bromomethyl-Δ²-cephem - 4 - carboxylate in dry benzene was mixed with excess methyl mercaptan, and the procedure described in Example 8 was followed. There was obtained as product tert-butyl 7-phenoxyacetamido-3-methylthiomethyl-Δ²-cephem-4-carboxylate. An NMR spectrum indicated definitive signals for the product which were a multiplet at 3.3 parts per million (p.p.m) for the 3-methylene group and a singlet at 1.98 p.p.m. for the 3 protons of the thiomethyl group, relative to tetramethylsilane in deuteriochloroform as a solvent standard.

The 3-oxymethyl ether Δ²-cephalosporin ester products of this invention are readily converted to the corresponding 3-oxymethyl ether Δ³-cephalosporin acid antibiotics by the oxidation-reduction-de-esterification procedure described hereinabove. These compounds can also be used as intermediates for the preparation of the 7-amino-3-oxymethyl ether Δ³-cephalosporin ester nuclei by cleaving the 7-amino-blocking or acyl group by known methods. The latter nuclei esters can then be acylated by known methods with any desired acylating agent or group known to contribute to the formation of antibiotically active Δ³-cephalosporanic acid compounds. When such 7-amino acylation is completed, the ester group can be removed from the carboxyl group by known methods. Alternatively, 7 - amino - 3 - oxymethyl ester Δ³-cephalosporin ester nuclei can first be de-esterified and then acylated with the desired acyl group to obtain the desired 7 - acylamido - 3 - oxymethyl ether - Δ³ - cephem-4-carboxylic acid antibiotic.

Similarly, the 3-cyanomethyl Δ²-cephalosporin ester products of this invention are readily converted to the corresponding 3-cyanomethyl Δ³-cephalosporin acid antibiotics by the oxidation-reduction-de-esterification procedure described hereinabove. These compounds can also be used as intermediates for the preparation of the 7-amino-3-cyanomethyl-Δ³-cephalosporin ester nuclei by cleaving the 7-amino blocking or 7-acyl group by known methods. These latter nuclei esters, also, can then be acylated by known methods with the desired acylating agent, as above, in the process of preparing 7-acylamido-3-cyanomethyl-Δ³-cephem-4-carboxylic acid antibiotics.

ester compounds by the oxidation-reduction or base isomerization procedures defined above. If desired, the 7-acyl group of these compounds can be cleaved by methods described above, the resulting nucleus can be re-acylated with any desired acyl group and the ester groups can be removed by known methods to obtain the $\Delta^3$-cephalosporin antibiotic.

The new 3-aliphatic N,N-dialkylaminomethyl- and related heterocyclic aminomethyl-$\Delta^2$-cephalosporin ester products of this invention are readily converted to the corresponding aminomethyl-$\Delta^3$-cephalosporin acid antibiotics by the double bond base isomerization and de-esterification procedures described above. These compounds are also useful as intermediates for the preparation of the 7-amino-3-(N,N-dialkylaminomethyl) - $\Delta^3$ - cephalosporin ester nuclei and other related aminomethyl ester nuclei by cleaving the 7-amino blocking group or 7-acyl group by known methods. These latter 3-aminomethyl ester nuclei can then be acylated by known methods with any desired acyl group, as above in the process of preparing 7-acylamido-3-(N,N-dialkylaminomethyl)-$\Delta^3$-cephem - 4 - carboxylic acid antibiotics, and the related antibiotics from the other aliphatic amine cephalosporin derivatives.

These uses of the products of this invention are llustrated by the following examples.

EXAMPLE 54

This and the following examples illustrate the acylation of a typical 7-amino-$\Delta^3$-cephem nucleus ester obtained from products of this invention, with several different acylating agents and the hydrolysis of the ester groups in the preparation of antibiotically active cephalosporin compounds.

Acylation

In this specific example the p-methoxybenzyl 7-amino-3-methoxymethyl-$\Delta^3$-cephem-4-carboxylate nucleus was first prepared by subjecting the product of Example 19 to the oxidation-reduction procedure described hereinabove. The 7-phenoxyacetyl group was then cleaved by procedures referred to above to obtain the p-methoxybenzyl 7-amino-3-methoxymethyl-$\Delta^3$-cephem - 4 - carboxylate ester nucleus as the tosylate (p-toluenesulfonic acid) salt).

A mixture of 268 mg. (0.5 mmole) of the tosylate salt of p-methoxybenzyl 7-amino-3-methoxymethyl-3-cephem-4-carboxylate and 336 mg. (2.0 mmoles) of sodium bicarbonate was stirred in 25 ml. of acetone while cooling the reaction mixture in an ice-bath. After adding 130 mg. (0.62 mmoles) of 2-benzothiopheneacetyl chloride, the reaction was stirred for one hour in the cold (0–5° C.) followed by a further two hours at room temperature. The reaction solution was then diluted with 100 ml. of water. The solid which precipitated was collected, washed with water, and vacuum dried at 45°, yielding 250.0 mg. (93 percent) of product, M.P. 182–5. The NMR spectrum and micro-analysis confirmed the structure of this compound. It was shown by thin layer chromatography (TLC) to contain only one product, p-methoxybenzyl 7-(2'-benzothienylacetamido) - 3 - methoxymethyl - $\Delta^3$ - cephem - 4-carboxylate. A summary of similar acylations follows:

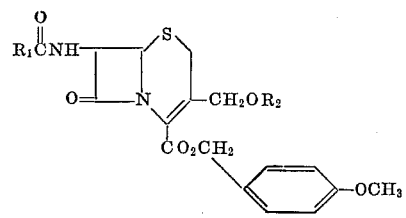

| R₁ | R₂ | M.P., °C. | Caled. C | Caled. H | Caled. N | Found C | Found H | Found N |
|---|---|---|---|---|---|---|---|---|
| p-Nitrobenzyl | CH₃ | 201-5 | 56.92 | 4.78 | 4.97 | 56.92 | 4.83 | 8.05 |
| 2-benzothienylmethyl | CH₃ | 182-5 | 60.22 | 4.87 | 5.20 | 60.02 | 4.97 | 5.19 |
| 3-chlorobenzyl | CH₃ | 171-4 | 58.07 | 4.87 | 5.42 | 57.82 | 4.91 | 5.36 |
| 3-chlorophenylthiomethyl | CH₃ | 138-143 | 54.68 | 4.59 | 5.10 | 54.84 | 4.81 | 5.32 |
| CH₃O-[oxadiazole]-CH₂— | CH₃ | 158-165 | 52.38 | 4.80 | 11.11 | 50.35 | 5.04 | 10.00 |
| phenyl-CH(OCOH)— | CH₃ | 149-150 | 59.77 | 4.24 | 5.36 | 59.70 | 4.06 | 5.19 |
| 2-thienylmethyl | Et | | 57.37 | 5.22 | 5.58 | 57.64 | 5.33 | 5.35 |

Hydrolysis

The p-methoxybenzyl 7-(4'-nitrophenylacetamido)-3-methoxymethyl-$\Delta^3$-cephem-4-carboxylate ester from the above table was selected to illustrate this step.

A solution of 120 mg. (0.23 mmole) of p-methoxybenzyl 7-(4-nitrophenylacetamido) - 3 - methoxymethyl-3-cephem-4-carboxylate, 0.4 ml. of trifluoroacetic acid and 20 drops of anisole in 10 ml. of benzene was allowed to stand at room temperature for 1.5 hours. The reaction solution was then added to 100 ml. of pH 7 phosphate buffer. After separation of layers, the aqueous layer was washed with water and with saturated NaCl solution, dried (MgSO₄), and concentrated. The residue was dissolved in 15 ml. of ethanol and 0.4 ml. of 1 N solution of sodium acetate in methanol was added. After 2 hours at 0°, the solid was collected, washed with ethanol and dried in vacuo at 45°, yielding 76 mg. (83 percent) of crystalline product, 7-(4'-nitrophenylacetamido) - 3-methoxymethyl-$\Delta^3$-cephem-4-carboxylic acid. The NMR and UV spectra confirmed the structure of this compound. The microanalysis was also in agreement with calculated values. A summary of the physical chemical data obtained for this salt of the above and other acids of the formula below is given in the following table:

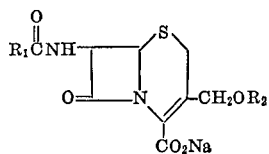

| R₁ | R₂ | Analysis Calcd. C | H | N | Found C | H | N | λ | ε |
|---|---|---|---|---|---|---|---|---|---|
| NO₂-C₆H₄-CH₂- | CH₃ | 47.54 | 3.75 | 9.78 | 47.70 | 4.15 | 9.51 | 217, 265 | 10,800; 16,300 |
| naphthyl-CH₂- | CH₃ | 51.81 | 3.89 | 6.36 | 51.91 | 3.73 | 6.30 | 227, 258, 297 | 17,000; 9,550; 2,000 |
| Cl-C₆H₄-CH₂- | CH₃ | 49.08 | 4.76 | 6.02 | 48.81 | 4.69 | 5.73 | 258 | 7,000 |
| Cl-C₆H₄-SCH₂- | CH₃ | 45.28 | 3.58 | 6.21 | 44.99 | 3.78 | 5.92 | 252 | 12,300 |
| CH₃O-oxadiazolyl-CH₂- | CH₃ | 41.37 | 3.72 | 13.79 | 41.40 | 4.01 | 13.50 | | |
| D-C₆H₄(OH)-CH- | CH₃ | 50.99 | 4.28 | 7.00 | 45.96 | 4.76 | 6.37 | 258 | 6,800 |
| thienyl-CH₂- | Et | 57.37 | 5.22 | 5.58 | 57.64 | 5.33 | 5.35 | | |

The above new sodium 7-acylamido-3-alkoxymethyl-Δ³-cephem-4-carboxylic acid salts are antibiotically active against a variety of Gram-positive and Gram-negative organisms.

An oxidation procedure to which the 3-nucleophile-methyl-Δ²-cephem products of this invention can be subjected is disclosed in United States patent application Ser. No. 764,939, filed Oct. 3, 1968. A procedure for reducing cephalosporin sulfoxides is described in United States patent application Ser. No. 764,925, filed Oct. 3, 1968. Suitable 7-acyl group cleavage procedures which may be used in the process of changing 7-acyl groups to prepare potent Δ³-cephalosporin antibiotics from the products of this process are described in United States applications Ser. No. 651,662, filed July 7, 1967, and Ser. No. 758,600, filed Sept. 9, 1968.

We claim:

1. A process which comprises reacting N-bromosuccinimide with a cephalosporin compound of the formula

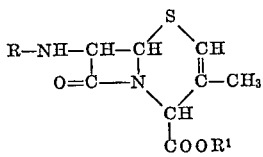

wherein R is an amino-protecting group which will protect the nitrogen to which it is bonded from attack by N-bromosuccinimide, and R¹ is the residue of an ester group which is removable by dilute aqueous base, by trifluoroacetic acid, hydrochloric acid, p-toluenesulfonic acid, zinc in formic or acetic acid, or by hydrogenation in the presence of a palladium or rhodium catalyst on a suitable carrier, in an inert, substantially anhydrous organic liquid diluent at temperatures of from about 40° C. to about 100° C. to form a compound of the formula

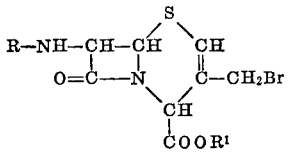

wherein R and R¹ are as defined above.

2. A compound of the formula

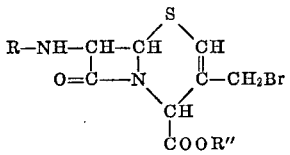

wherein

R is selected from the group consisting of trimethylsilyl, triphenylmethyl, butoxycarbonyl, phenoxyacetyl, phenylmercaptoacetyl, phenyl-α,α-dimethylacetyl, and such phenoxyacetyl, phenylacetyl, phenylmercaptoacetyl, and phenyl-α,α-dimethylacetyl substituted on ring carbon atoms thereof with fluorine, chlorine, bromine, iodine, $C_1$ to $C_6$-alkyl, $C_1$ to $C_2$-alkyloxy, butoxycarbonylmethyl, nitro, cyano or trifluoromethyl, and R″ is selected from the group consisting of $C_4$ to $C_6$-tert-alkyl, $C_5$ to $C_7$-tert-alkenyl, $C_5$ to $C_6$-tert-alkynyl, benzyl, methoxybenzyl, nitrobenzyl, benzhydryl, phenacyl, trimethylsilyl, phthalimidomethyl and succinimidomethyl.

3. A compound as defined in claim 2 wherein the compound is 4-methoxybenzyl-7-(phenoxyacetamido)-3-bromomethyl-Δ²-cephem-4-carboxylate.

4. A process which comprises
(a) reacting N-bromosuccinimide with a cephalosporin compound of the formula

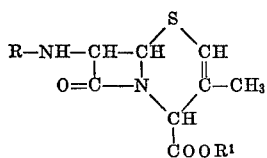

wherein R is an amino-protecting group, which will protect the nitrogen to which it is bonded from attack by N-bromosuccinimide, and $R^1$ is the residue of an ester group which is removable by dilute aqueous base, by trifluoroacetic acid, hydrochloric acid, p-toluenesulfonic acid, zinc in formic or acetic acid, or by hydrogenation in the presence of a palladium or rhodium catalyst on a suitable carrier, in a substantially anhydrous organic solvent medium at a temperature of from about 40° C. to about 100° C., and (b) reacting the reaction product of step (a) with a nucleophilic substance which provides a negatively charged group or which is a neutral molecule bearing an unshared pair of electrons, and which engages in a nucleophilic substitution reaction with the 3-bromomethyl group of the product of step (a) to form as product a compound of the formula

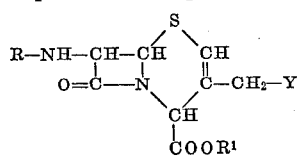

wherein

R and $R^1$ are as defined above, and Y is the nucleophile.

The 3-thiomethyl ether $\Delta^2$-cephalosporin ester products of this invention can be converted to $\Delta^3$-cephalosporin 5. A process as defined in claim 4 wherein:
in step (a) the cephalosporin compound is one in which R is an acyl group of the formula

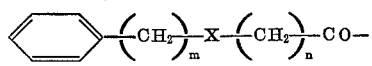

wherein $m$ is an integer of from 0 to 4 inclusive, $n$ is an integer of from 1 to 4 inclusive, X is oxygen or sulfur or a chemical bond, and such acyl groups substituted on a phenyl carbon atom with fluorine, chlorine, bromine, iodine, alkyl having from 1 to 6 carbon atoms, alkyloxy having from 1 to 2 carbon atoms, nitro, cyano, or trifluoromethyl; and R" is selected from the group consisting of $C_4$ to $C_6$-tert-alkyl
$C_5$ to $C_7$-tert-alkenyl
$C_5$ to $C_7$-tert-alkynyl
benzyl
methoxybenzyl
nitrobenzyl
benzhydryl
phenacyl
trimethylsilyl
pthalimidomethyl, and
succinimidomethyl and in step (b) the nucleophilic reagent is selected from the group consisting of
(1) compounds of the formula

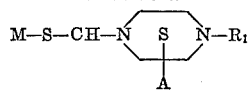

wherein M is hydrogen or alkali metal, $R_1$ is $C_1$ to $C_6$ alkyl, $C_2$ to $C_6$ alkenyl, carbo-$C_1$ to $C_2$ alkoxy, and A is hydrogen or carboxyl;

(2) pyridine type compounds of the formula

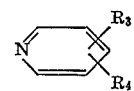

wherein $R_3$ is hydrogen, fluorine, chlorine, bromine, $C_1$ to $C_3$ alkyl, carboxyl, carboxamide, N-methylcarboxamide, N,N-dimethylcarboxamide, and $R_4$ is hydrogen, fluorine, chlorine, bromine, or $C_1$ to $C_3$ alkyl;

(3) thiourea, thioacetamide, thiosemicarbazide, N-alkylthiourea having from 1 to 6 carbon atoms in the alkyl, N-phenylthiourea, and alkali metal salts of such compounds;

(4) dithiocarbamates and xanthates of the formulas

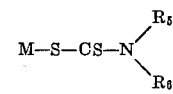

and

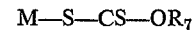

wherein each of $R_5$ or $R_6$ is $C_1$ to $C_6$ alkyl or $R_5$ and $R_6$ taken together with the nitrogen to which they are bonded complete a 4 to 5 methylene carbon atom ring, $R_7$ is $C_1$ to $C_{12}$ primary alkyl, $C_3$-$C_{12}$ secondary alkyl, and $C_3$-$C_7$ cycloalkyl, and M is an alkali metal ion.

(5) M—$N_3$; M—SCN, M—$NO_2$, M—CN where M is an alkali metal ion, or alkaline earth metal ion or a cuprous or silver ion;

(6) compounds of the formula

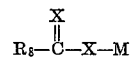

wherein each X is oxygen or sulfur, and $R_8$ is hydrogen, $C_1$ to $C_6$ alkyl, $C_2$ to $C_6$ alkenyl, phenyl, benzyl, and phenylethyl, and such phenyl, benzyl, and phenylethyl groups substituted on the ring carbon atoms thereof with trifluoromethyl, nitro, cyano, $C_1$ to $C_3$ alkyl, $C_1$ to $C_2$ alkoxy, fluorine, bromine, or chlorine, or $R_8$ is

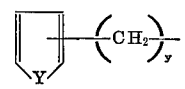

where Y is >NH, —O—, or —S—, and $y$ is 0 to 1, and M is alkali or alkaline earth metal;

(7) amines selected from the group consisting of primary alkylamines having from 1 to 6 carbon atoms in the alkyl group, diakylamines having from 1 to 6 carbon atoms in each alkyl, and trialkylamines having a total of from 3 to 12 carbon atoms, cyclopentylamine, cyclohexylamine, cycloheptylamine, monocyclic saturated nitrogen containing heterocyclic amines containing from 4 to 6 ring carbon atoms and a total of from 5 to 7 ring forming atoms, and aromatic amines of the formula

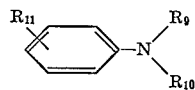

wherein each of $R_9$ and $R_{10}$ is hydrogen or methyl and $R_{11}$ is hydrogen, $C_1$ to $C_3$ alkyl, $C_1$ to $C_2$ alkoxy;

(8) compounds of the formula

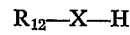

wherein X is oxygen or sulfur, and $R_{12}$ is hydrogen, $C_1$ to $C_{10}$ alkyl, $C_3$ to $C_{10}$ alkenyl, $C_3$ to $C_{10}$ alkynyl, $C_5$ to $C_7$-cycloalkyl, $C_5$ to $C_7$-cycloalkyl-$C_1$ to $C_6$-alkyl, $C_2$ to $C_{10}$-haloalkyl, $C_3$ to $C_{10}$ haloalkenyl, and $C_3$ to $C_{10}$ haloalkynyl, where the halogen is fluorine, chlorine, bromine, or iodine, $C_1$ to $C_3$-cyanoalkyl, phenyl, benzyl, and phenylethyl, and such phenyl, benzyl, and phenylethyl substituted on ring carbon atoms with $C_1$ to $C_3$ alkyl, $C_1$ to $C_3$-alkyloxy, $C_1$ to $C_3$-alkyloxycarbonyl, fluorine, chlorine, bromine, nitro, cyano, or trifluoromethyl, $C_1$ to $C_3$-alkyl-X-$C_2$ to $C_6$-alkyl where X is oxygen or sulfur, $C_2$ to $C_4$ alkanoyl-$C_1$ to $C_6$-alkyl, $C_2$ to $C_4$ alkanoyloxy-$C_2$ to $C_6$-alkyl, $C_1$ to $C_6$ alkyloxycarbonyl-$C_1$ to $C_6$-alkyl, and

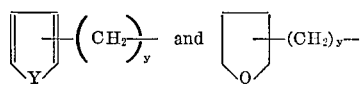

where Y is >NH, —O—, or —S—, and y is 0 to 2, and sodium and potassium and calcium salts of such compounds that have pKa's less than 11, and (9) N-aminoalkyldithiocarbamate compounds of the formula

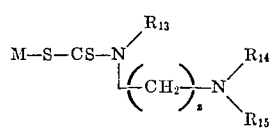

wherein z is 2 to 3, $R_{13}$ is $C_1$ to $C_6$ alkyl, each of $R_{14}$ and $R_{15}$ taken separately is $C_1$ to $C_6$ alkyl, $R_{14}$ and $R_{15}$ taken together with the nitrogen to which they are bonded form a ring containing from 4 to 6 ring carbon atoms and $R_{14}$ and $R_{15}$ taken together contain a total of not more than 8 carbon atoms, and M is hydrogen or alkali metal.

6. A process as defined in claim 5 wherein in step (a) the cephalosporin compound is a methoxybenzyl 3-methyl - 7 - phenoxy-acetamido-$\Delta^2$-cephem-4-carboxylate, and in step (b) the nucleophilic reagent is a compound of formula of group (6).

7. A process as defined in claim 6 wherein in step (a) the compound is 4-methoxybenzyl 3-methyl-7-phenoxyacetamido-$\Delta^2$-cephem-4-carboxylate, and in step (b) the nucleophilic reagent from group (6) is one in which X is oxygen, $R_8$ is $C_1$ to $C_6$ alkyl, and M is alkali metal.

8. A process as defined in claim 7 wherein step (a) is conducted in the presence of azobisisobutyronitrile, and in step (b) the nucleophilic reagent is potassium acetate to form 4 - methoxybenzyl 3 - acetoxymethyl - 7 - phenoxyacetamide-$\Delta^2$-cephem-4-carboxylate.

9. A process as defined in claim 5 wherein in step (a) the cephalosporin compound is a tert-butyl 3-methyl-7-phenoxyacetamido-$\Delta^2$-cephem-4-carboxylate, and in step (b) the nucleophilic reagent is a compound of the formula in group (8).

10. A process as defined in claim 9 wherein step (a) the cephalosporin compound is a tert-butyl 3-methyl-7-phenoxyacetamido-$\Delta^2$-cephem-4-carboxylate, and in step (b) the nucleophilic reagent from group (8) is one in which X is oxygen and $R_{12}$ is $C_1$ to $C_{10}$ alkyl.

11. A process as defined in claim 10 wherein step (a) is conducted in the presence of azobisisobutyronitrile, and in step (b) the nucleophilic reactant is methanol to form tert-butyl 3-methoxymethyl - 7 - phenoxyacetamido-$\Delta^2$-cephem-4-carboxylate.

12. A compound of the formula

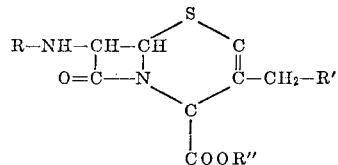

wherein

R is selected from the group conisting of trimethylsilyl, triphenylmethyl, butoxycarbonyl, phenoxyacetyl, phenylacetyl, phenylmercaptoacetyl, phenyl-α,α-dimethylacetyl, such phenoxyacetyl, phenylacetyl, phenylmercaptoacetyl, and phenyl-α,α-dimethylacetyl groups substituted on ring carbon atoms thereof with fluorine, chlorine, bromine, iodine, $C_1$ to $C_6$-alkyl, $C_1$ to $C_2$-alkyloxy butoxycarbonylmethyl, nitro, cyano, or trifluoromethyl;

R' is —CN, —XY where X is oxygen or sulfur, and Y is $C_1$ to $C_{10}$-alkyl, $C_3$ to $C_{10}$-alkenyl, $C_3$ to $C_{10}$-alkynyl, $C_2$ to $C_{10}$-haloalkyl, $C_3$ to $C_{10}$-haloalkenyl and $C_3$ to $C_{10}$-haloalkyl where the halogen is fluorine, chlorine, bromine, or iodine, $C_1$ to $C_3$-cyanoalkyl, $C_1$ to $C_3$-alkyl-X-$C_2$ to $C_6$-alkyl where X is oxygen or sulfur, $C_5$ to $C_7$-cycloalkyl, $C_5$ to $C_7$-cycloalkyl-$C_1$ to $C_6$-alkyl, $C_1$ to $C_6$-alkyloxycarbonyl-$C_1$ to $C_5$ alkyl, $C_2$ to $C_4$-alkanoyl-$C_1$ to $C_6$ alkyl, $C_2$ to $C_4$-alkanoyloxy-$C_2$ to $C_6$-alkyl, (2'-tetrahydrofuryl)-$C_1$ to $C_3$-alkyl, 3'-tetrahydrofuryl (2'-thienyl-$C_1$ to $C_3$-alkyl, phenyl, benzyl, phenylethyl, and phenyl, benzyl; and phenylethyl substituted with cyano, nitro, trifluoromethyl, $C_1$ to $C_3$-alkyloxy, $C_1$ to $C_3$-alkyl, and $C_1$ to $C_3$-alkyloxycarbonyl (—COO— alkyl where alkyl has 1 to 3 carbons), or

where each of $R^3$ and $R^4$ taken separately is $C_1$ to $C_6$ alkyl, or taken together with the nitrogen to which they are bonded complete a heterocyclic, monocyclic ring containing from 5 to 6 ring atoms of the formula

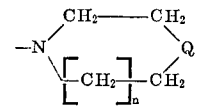

where n is 0 or 1, and Q is —$CH_2$—, —O—, —S—, or >$NR^5$ where $R^5$ is hydrogen or $C_1$ to $C_4$-alkyl, except when n is 0, Q is —$CH_2$—, and R'' is selected from the group consisting of $C_4$ to $C_6$-tert-alkyl, $C_5$ to $C_7$-tert-alkenyl, $C_5$ to $C_7$-tert-alkynyl, benzyl, methoxybenzyl, nitrobenzyl, phenacyl, trimethylsilyl, benzhydryl, phthalimidomethyl and succinimidomethyl.

13. A compound as defined in claim 12 wherein R is phenoxyacetyl, R' is —OY, Y is $C_1$ to $C_{10}$ alkyl, and R'' is $C_4$ to $C_6$ alkyl.

14. A compound as defined in claim 13 wherein the compound is tert-butyl 7-phenoxyacetamido-3-methoxymethyl-$\Delta^2$-cephem-4-carboxylate.

15. A compound as defined in claim 12 wherein R is phenoxyacetamido, R' is —CN, and R'' is a methoxybenzyl.

16. A compound as defined in claim 15 wherein the compound is p-methoxybenzyl 7-phenoxyacetamido-3-cyanomethyl-$\Delta^2$-cephem-4-carboxylate.

17. A compound as defined in claim 12 wherein R is phenoxyacetyl, R' is —XY where X is sulfur and Y is $C_1$ to $C_{10}$ alkyl, and R'' is $C_4$ to $C_6$-tert-alkyl.

18. A compound as defined in claim 17 wherein the compound is tert-butyl 7-phenoxyacetamido-3-methylthiomethyl-$\Delta^2$-cephem-4-carboxylate.

19. A compound as defined in claim 12 wherein R is phenoxyacetamido, R' is $-NR_3R_4$ wherein each of $R_3$ and $R_4$ is $C_1$ to $C_6$ alkyl, and R'' is a $C_4$ to $C_6$-tert-alkyl.

20. A compound as defined in claim 19 wherein the compound is tert-butyl 7-phenoxyacetamido-3-(N,N-dimethylaminomethyl)-$\Delta^2$-cephem-4-carboxylate.

References Cited

UNITED STATES PATENTS 3,218,318  11/1965  Flynn _____ 260—243 C

NICHOLAS S. RIZZO, Primary Examiner

U.S. Cl. X.R.

424—246

PO-1050
(5/69)

UNITED STATES PATENT OFFICE
CERTIFICATE OF CORRECTION

Patent No. 3,637,678     Dated January 25, 1972

Inventor(s) J. Alan Webber and Earl M. VanHeyningen

It is certified that error appears in the above-identified patent and that said Letters Patent are hereby corrected as shown below:

Column 5, after line 6, after "$C_3$ to $C_{10}$-haloalkynyl" insert --where the halogen is fluorine, chlorine, bromine, or iodine, $C_1$ to $C_3$-cyanoalkyl, $C_1$ to $C_3$-alkyl-X-$C_2$ to $C_6$-alkyl--.

Column 5, delete lines 8 and 9 of the patent.

Column 5, line 24, "nitorgen" should read --nitrogen--.

Column 13, line 21, "CHl" should read --HCl--.

Column 13, line 30, "porduct" should read --product--.

Column 16, line 45, "preper" should read --prepare--.

Column 16, line 5, "soluton" should read --solution--.

Column 17, line 8, "cepham" should read --cephem--.

Column 19, line 63, "$\Delta^2$-cephalosproin" should read --$\Delta^2$-cephalosporin--.

Column 27, line 50, "phenoxyacetmadio" should read --phenoxyacetamido--.

Column 29, line 1, insert the beginning of a new paragraph as follows --The 3-thiomethyl ether $\Delta^2$-cephalosporin ester products of this invention can be converted to $\Delta^3$-cephalosporin--.

Column 31, in the table, in the next to the last line, opposite the structure

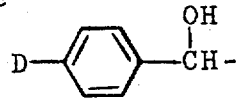

the number "45.96" should read --45.56--.

UNITED STATES PATENT OFFICE

CERTIFICATE OF CORRECTION

Patent No. 3,637,678                  Dated January 25, 1972

Inventor(s) J. Alan Webber and Earl M. VanHeyningen

It is certified that error appears in the above-identified patent and that said Letters Patent are hereby corrected as shown below:

-2-

Column 32, line 62, after the first "acetyl" insert --phenylacetyl,--.

Column 32, line 69, "$C_5$ to $C_6$-tert-alkynyl" should read --$C_5$ to $C_7$-tert-alkynyl--.

Column 33, lines 38 and 39 should be deleted.

Column 36, line 24, "$C_3$ to $C_{10}$-haloalkyl" should read --$C_3$ to $C_{10}$-haloalkynyl--.

Column 36, line 28, "$C_1$ to $C_6$-alkyloxycarbonyl-$C_1$ to $C_5$" should read --$C_1$ to $C_6$-alkyloxycarbonyl-$C_1$ to $C_6$--.

Signed and sealed this 3rd day of April 1973.

(SEAL)
Attest:

EDWARD M. FLETCHER, JR.                ROBERT GOTTSCHALK
Attesting Officer                      Commissioner of Patents